United States Patent
Lew et al.

(10) Patent No.: US 7,733,419 B1
(45) Date of Patent: Jun. 8, 2010

(54) METHOD AND APPARATUS FOR FILTERING VIDEO DATA USING A PROGRAMMABLE GRAPHICS PROCESSOR

(75) Inventors: Stephen D. Lew, Sunnyvale, CA (US); Garry W. Amann, Austin, TX (US); Hassane S. Azar, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 11/957,363

(22) Filed: Dec. 14, 2007

Related U.S. Application Data

(60) Provisional application No. 10/448,590, filed on May 29, 2003, now Pat. No. 7,508,448.

(51) Int. Cl.
*H04N 7/01* (2006.01)

(52) U.S. Cl. .................. 348/441; 348/443; 348/447; 348/458

(58) Field of Classification Search .......... 348/441, 348/449–458, 556, 443, 447, E5.055, E7.003; 345/531, 557, 559, 419, 629; *H04N 7/01*
See application file for complete search history.

(56) References Cited

U.S. PATENT DOCUMENTS

| | | | |
|---|---|---|---|
| 6,034,733 A | 3/2000 | Balram et al. | |
| 6,118,452 A | 9/2000 | Gannett | |
| 6,704,018 B1 | 3/2004 | Mori et al. | |
| 6,825,850 B2 | 11/2004 | Wang et al. | |
| 6,963,345 B2 | 11/2005 | Boyd et al. | |
| 6,970,206 B1 | 11/2005 | Swan et al. | |
| 7,015,909 B1 | 3/2006 | Morgan et al. | |
| 7,219,352 B2 | 5/2007 | Estrop | |
| 7,451,457 B2 * | 11/2008 | Estrop | 719/323 |
| 7,508,448 B1 | 3/2009 | Lew et al. | |
| 2002/0171656 A1 * | 11/2002 | Lavelle et al. | 345/557 |
| 2004/0057624 A1 | 3/2004 | Wells | |
| 2004/0189651 A1 | 9/2004 | Zatz et al. | |
| 2004/0207751 A1 | 10/2004 | White et al. | |

OTHER PUBLICATIONS

Office Action. U.S. Appl. No. 11/957,361, Mailed on Jul. 17, 2009.

* cited by examiner

*Primary Examiner*—Trang U Tran
(74) *Attorney, Agent, or Firm*—Patterson & Sheridan, LLP

(57) ABSTRACT

Video filtering using a programmable graphics processor is described. The programmable graphics processor may be programmed to complete a plurality of video filtering operations in a single pass through a fragment-processing pipeline within the programmable graphics processor. Video filtering functions such as deinterlacing, chroma up-sampling, scaling, and deblocking may be performed by the fragment-processing pipeline. The fragment-processing pipeline may be programmed to perform motion adaptive deinterlacing, wherein a spatially variant filter determines, on a pixel basis, whether a "bob", a "blend", or a "weave" operation should be used to process an interlaced image.

15 Claims, 15 Drawing Sheets

METHOD AND APPARATUS FOR FILTERING VIDEO DATA USING A PROGRAMMABLE GRAPHICS PROCESSOR

CROSS-REFERENCE TO RELATED APPLICATIONS

This application is a divisional of co-pending U.S. patent application Ser. No. 10/448,590, filed May 29, 2003, which is herein incorporated by reference

FIELD OF THE INVENTION

The present invention relates to graphics processors, and more particularly to filtering video data using said graphics processors.

DESCRIPTION OF THE BACKGROUND

Current graphics data processors have processing units that perform specific operations on graphics data including linear interpolation, bilinear interpolation, and trilinear interpolation. Video filtering for processing video data and displaying high quality images requires filtering the video data using more than two taps or using non-linear filters. Current video filtering systems use dedicated processors to perform video filtering operations and generate high quality images. The high quality images are integrated with data output by a graphics data processor using an overlay technique. Recently, graphics data processors may be programmed using shader programs and vertex programs, permitting a wider variety of functions to be performed using these programmable graphics processors.

Accordingly, video filtering has computational requirements that it would be desirable to meet by application of the computational resources of a programmable graphics processor.

SUMMARY

New systems and methods for processing of video data are disclosed. The systems include a programmable graphics processor configured to produce filtered video data. In various embodiments, the video data is stored in a format suitable as an input to a shading pipeline within the programmable graphics processor. For example, in some embodiments, video data is saved in a texture data format. Video data may, therefore, be manipulated using the shading pipeline to produce filtered video data.

The shading pipeline receives an input video signal having a plurality of odd and even fields. The shading pipeline applies a spatially variant deinterlacing function on each pixel within a frame containing an odd field and an even field to produce deinterlaced video frames.

Alternatively, the shading pipeline receives an input video signal having a plurality of odd and even frames into a shading pipeline. The shading pipeline applies a spatially variant deinterlacing function on the input video signal in a single pass through the shading pipeline to produce deinterlaced video frames.

Alternatively, the shading pipeline receives pixel data associated with a pixel within a video frame. The shading pipeline extracts fractional portions from texture coordinates associated with the pixel to use as a filter kernel phase. The shading pipeline accesses a plurality of filter values using the filter kernel phase. The shading pipeline applies the plurality of filter values to the pixel data to produce scaled pixel data within a scaled video frame.

Alternatively, the shading pipeline receives an input video signal into a shading pipeline. The shading pipeline applies a deblocking function on the input video signal in a single pass through the shading pipeline to produce deblocked video data.

Alternatively, the shading pipeline receives an input video signal having a plurality of odd and even frames into a shading pipeline. The shading pipeline applies a spatially variant deinterlacing function on the input video signal using a shader program to produce deinterlaced video data.

Alternatively, the shading pipeline receives pixel data associated with a pixel within a video frame into a shading pipeline. The shading pipeline extracts fractional portions from texture coordinates associated with the pixel to produce a filter kernel phase within the shading pipeline using a shader program. The shading pipeline accesses a plurality of filter values using the filter kernel phase using the shader program. The shading pipeline applies the plurality of filter values to the pixel data to produce scaled pixel data within a scaled video frame using the shader program.

Alternatively, the shading pipeline receives an input video signal into a shading pipeline. The shading pipeline applies a deblocking function on the input video signal using a shader program.

The programmable graphics processor includes a digital video interface configured to receive digital video image data, a memory interface configured to read digital image data from a graphics memory, and the shading pipeline configured to perform at least one video filtering operation specified by shader program instructions on the digital video image data to produce each pixel in a filtered video frame.

A computing system includes a host processor, a host memory, a system interface, and the programmable graphics processor. The host memory stores programs for the host processor. The system interface is configured to interface with the host processor. The programmable graphics processor includes a memory interface and the shading pipeline. The memory interface is configured to read digital video image data from a graphics memory and write digital video image data to the graphics memory. The shading pipeline is configured to generate filtered video data by performing at least one video filtering operation, on the digital video image data, specified by shader program instructions.

A data structure stored on a computer readable medium includes a video data location field, a video data format field, a deinterlacing enable field, a scaling factor enable field, a deblocking enable field, a color space conversion enable field, and a destination address field.

An application programming interface for a graphics processor includes a function call to configure a shading pipeline within the programmable graphics processor to filter video data.

A shader program comprises an instruction to extract a fractional portion of a source register and stores the fractional portion extracted in a destination register.

A computer program embodied in a computer readable medium for sequencing graphics processing includes a code segment for receiving a plurality of bits indicative of the location of video data, a code segment for identifying a format used to represent the video data, a code segment to enable a deinterlacing function to process the video data, a code segment to enable a scaling function to process the video data, a code segment to enable a deblocking function to process the video data, and a code segment to enable a color space conversion function to process the video data.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
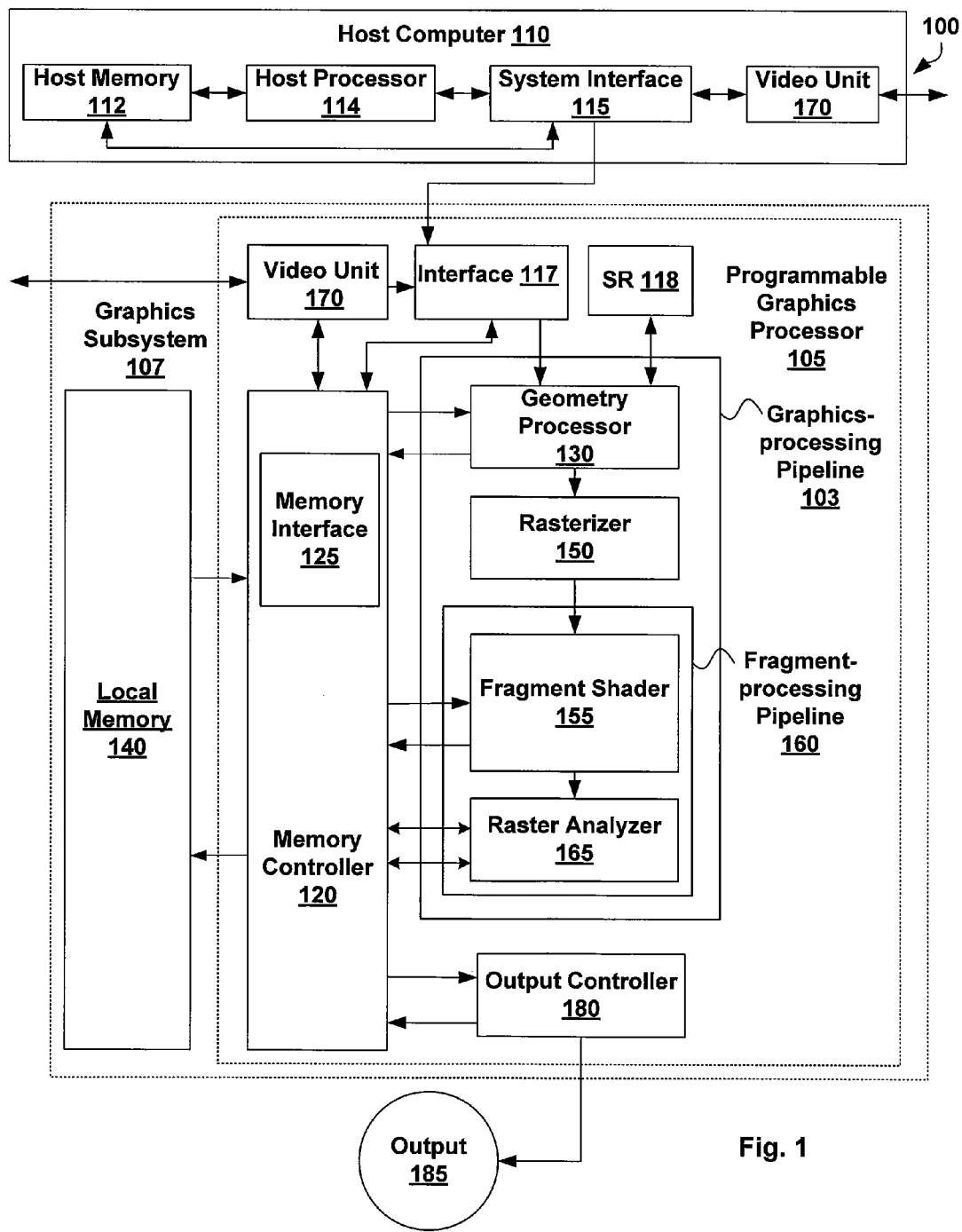
FIG. 1 is a block diagram of an exemplary embodiment of a respective computer system in accordance with one or more aspects of the present invention.

FIG. 1 is a block diagram of an exemplary embodiment of a Computing System generally designated 100 and including a Host Computer 110 and a Graphics Subsystem 107. Computing System 100 may be a desktop computer, server, laptop computer, palm-sized computer, tablet computer, game console, cellular telephone, computer based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host Computer 110 may include a Video Unit 170 that receives video image data and outputs digital video image data to System Interface 115. In one embodiment, Video Unit 170 includes a storage resource, e.g., register file, FIFO, cache, and the like, and a synchronization unit to output successive frames of video data. Host computer 110 communicates with Graphics Subsystem 107 via System Interface 115 and an Interface 117. Graphics Subsystem 107 includes a Local Memory 140 and a Programmable Graphics Processor 105. Programmable Graphics Processor 105 uses memory to store graphics data and program instructions, where graphics data is any data that is input to or output from the computation units within the Programmable Graphics Processor 105.

In addition to Interface 117, Programmable Graphics Processor 105 includes a Graphics-processing Pipeline 103, a Memory Controller 120 and an Output Controller 180. Programmable Graphics Processor 105 may also include Video Unit 170 that receives video image data and outputs digital video image data to Memory Controller 120 or Interface 117. Data and program instructions received at Interface 117 may be passed to a Geometry Processor 130 within Graphics-processing Pipeline 103 or written to Local Memory 140 through a Memory Interface 125 within Memory Controller 120. Memory Interface 125 includes read interfaces and write interfaces that each generate address and control signals to Local Memory 140, SR (Storage Resources) 118, Interface 117, and optional Video Unit 170. SR 118 may include register files, caches, FIFOs (first in first out), and the like. In addition to communicating with Local Memory 140, SR 118, Video Unit 170, and Interface 117, Memory Controller 120 also communicates with Graphics-processing Pipeline 103 and Output Controller 180 through read and write interfaces in Graphics-processing Pipeline 103 and a read interface in Output Controller 180. The read and write interfaces in Graphics-processing Pipeline 103 and the read interface in Output Controller 180 generate address and control signals to Memory Controller 120.

Within Graphics-processing Pipeline 105, Geometry Processor 130 and a shading pipeline, Fragment-processing Pipeline 160, perform a variety of computational functions. Some of these functions are table lookup, scalar and vector addition, multiplication, division, coordinate-system mapping, calculation of vector normals, tessellation, calculation of derivatives, interpolation, and the like. Program instructions specify the functions and the precision of computations to perform the functions. Geometry Processor 130 and Fragment-processing Pipeline 160 are optionally configured such that data processing operations are performed in multiple passes through Graphics-processing Pipeline 103 or in multiple passes through Fragment-processing Pipeline 160. Each pass through Programmable Graphics Processor 105, Graphics-processing Pipeline 103 or Fragment-processing Pipeline 160 concludes with optional processing by a Raster Analyzer 165. A pass is considered completed when processed data is output by Raster Analyzer 165.

Geometry Processor 130 receives a stream of program instructions, state bundles and data from Interface 117, Memory Controller 120 or SR 118, and performs vector floating-point operations or other processing operations using the data. State bundles are microcoded instructions used to configure subunits within Geometry Processor 130, Rasterizer 150 and Fragment-processing Pipeline 160. Codewords are also microcoded instructions containing information used to configure subunits within Geometry Processor 130, Rasterizer 150 and Fragment-processing Pipeline 160. Geometry Processor 130 generates codewords from vertex program instructions. Codewords generated in Geometry Processor 130 are used by subunits within Geometry Processor 130 and Rasterizer 150. State bundles are used by subunits within Geometry Processor 130, Rasterizer 150 and Fragment-processing Pipeline 160. Alternatively, configuration information is written to registers within Geometry Processor 130, Rasterizer 150 and Fragment-processing Pipeline 160 using program instructions, encoded with the data, or the like.

The program instructions, state bundles, and data are stored in graphics memory. Graphics memory is any memory used to store graphics data or program instructions to be executed by the graphics processor. Graphics memory may include portions of system memory, local memory directly coupled to the graphics processor, register files coupled to the computation units within the graphics processor, and the like, such as, portions of Host Memory 112, Local Memory 140 or SR 118 within Programmable Graphics Processor 105. When a portion of Host Memory 112 is used to store program instructions, state bundles and data the portion of Host Memory 112 may be uncached so as to increase performance of access by Programmable Graphics Processor 105.

Data processed by Geometry Processor 130, together with state bundles, shader program instructions, and codewords are passed from Geometry Processor 130 to a Rasterizer 150. Shader programs are sequences of shader program instructions compiled by Host Processor 114 for execution within Fragment-processing Pipeline 160. In a typical embodiment Rasterizer 150 performs scan conversion on the data processed by Geometry Processor 130 and outputs fragment data, pixel data, or sample data, state bundles and shader program instructions to Fragment-processing Pipeline 160. Each fragment is at least a portion of a pixel. Therefore, a shader program programs Fragment-data. For simplicity, the remainder of this description will use the term fragment data to refer to pixel data, sample data, and fragment data.

Shader programs program, as discussed below, the Fragment-processing Pipeline 160 to process fragment data by specifying computations and computation precision. A Fragment Shader 155, within Fragment-processing Pipeline 160, generates codewords from shader program instructions. Fragment Shader 155 optionally is configured by codewords generated in Fragment Shader 155 from shader program instructions such that fragment data processing operations are performed in multiple passes within Fragment Shader 155. Fragment Shader 155 and Fragment-processing Pipeline 160 may receive digital video image data from optional Video Unit 170 through Memory Controller 120.

Fragment data processed by Fragment Shader 155 is passed to Raster Analyzer 165, which optionally performs near and far plane clipping, color space conversion, and raster operations, such as stencil, z test, and the like, and saves the results, i.e., filtered image data, in graphics memory. Raster Analyzer 165 includes a read interface and a write interface to Memory Controller 120 through which Raster Analyzer 165 accesses data stored in Local Memory 140 or Host Memory 112. In various embodiments the data output from Raster Analyzer 165 is represented in a high-precision data format specified by shader program instructions such as 16, 32, 64, 128-bit or higher precision, fixed-point or floating-point. Therefore, in various embodiments Programmable Graphics Processor 105 is a high-precision programmable graphics processor.

Video filtering operations, as hereinafter described, may use high-precision data formats to generate filtered images including filtered video data, filtered frames intended for output, e.g., read from graphics memory or output by Output Controller 180, such as one frame in a film sequence of frames. Several intermediate filtered images may be generated before the final filtering operation to generate the filtered frame is performed. Furthermore, each filtered image that is output as a filtered frame may be further filtered to generate additional filtered frames. Each filtered frame may be represented in a video format for display or further processing as a video frame. Each pass through Graphics-processing Pipeline 103 or Fragment-processing Pipeline 160 is considered complete when data is output by Raster Analyzer 165 to be stored in graphics memory.

In various embodiments Memory Controller 120, Local Memory 140, and Geometry Processor 130 are configured such that data generated at various points along Graphics-processing Pipeline 103 may be output via Raster Analyzer 165 during a pass and provided to Geometry Processor 130 or Fragment-processing Pipeline 160 as input during a subsequent pass. Since the output of Raster Analyzer 165 may include floating-point data formats, data is optionally provided to Geometry Processor 130 or Fragment-processing Pipeline 160 without loss of precision. Furthermore, data is optionally processed in multiple passes through Graphics-processing Pipeline 103 without a loss of precision.

When processing is completed, an Output 185 of Graphics Subsystem 107 is provided using Output Controller 180. Alternatively, Host Processor 114 reads a frame stored in Local Memory 140 through Memory Controller 120, Interface 117 and System Interface 115. Output Controller 180 reads a frame stored in Local Memory 140 through Memory Controller 120 to deliver data to a display device, network, electronic control system, other Computing System 100, other Graphics Subsystem 110, or the like. Alternatively, the data, such as video frames, are output to a film recording device or written to a peripheral device, e.g., disk drive, tape, compact disk, or the like.

Figure 2:
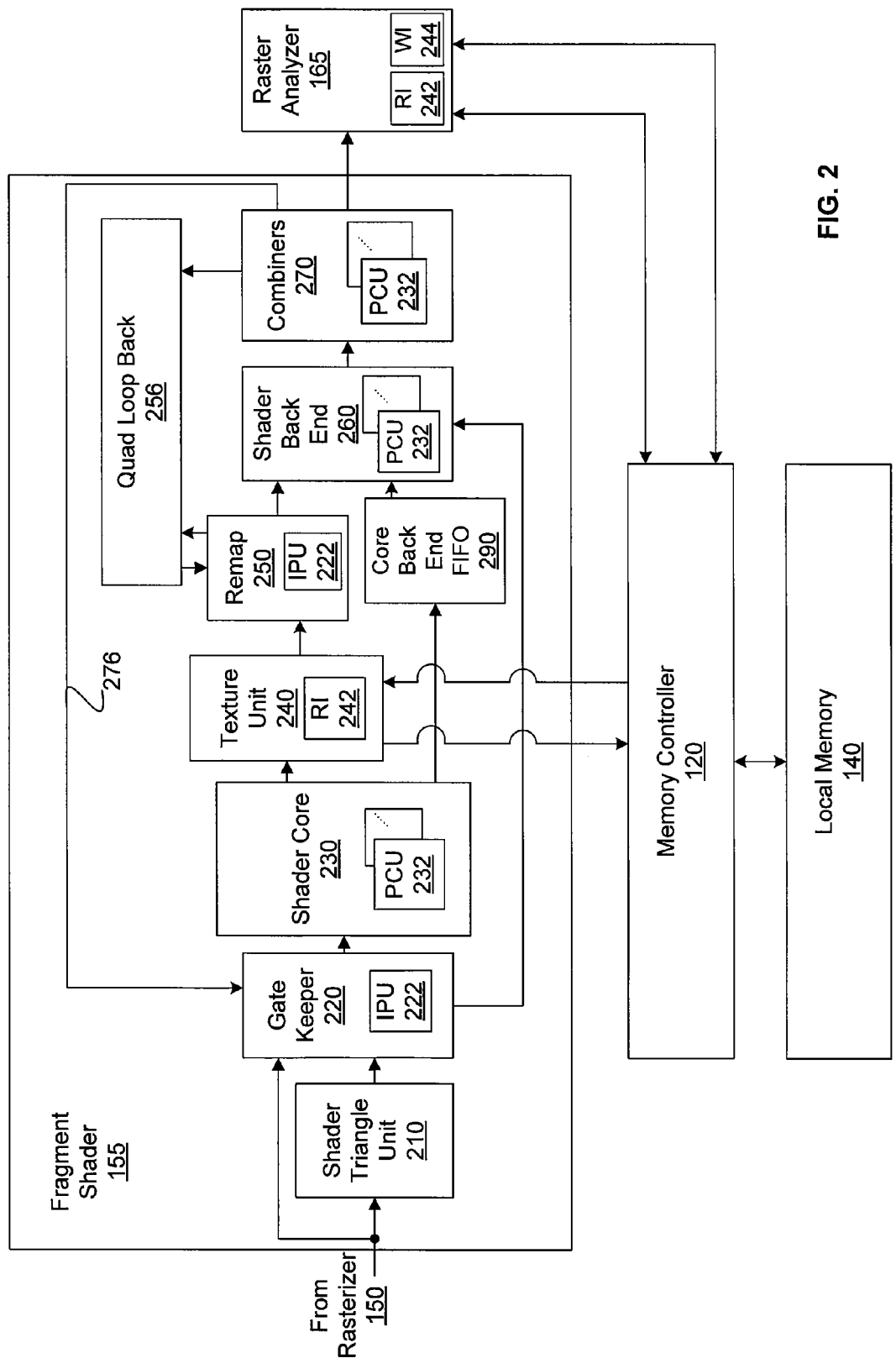
FIG. 2 is a block diagram of an exemplary embodiment of a shading pipeline in accordance with one or more aspects of the present invention.

FIG. 2 is a block diagram of an exemplary embodiment of a shading pipeline in accordance with one or more aspects of the present invention, including Fragment Shader 155 and Raster Analyzer 165. A Shader Triangle Unit 210 receives fragment data from Rasterizer 150 and calculates plane equations for texture coordinates, depth, and other parameters. A Gate Keeper 220 selects from among the fragment data from Rasterizer 150, the output from Shader Triangle Unit 210, or a Feedback Output 276 from Combiners 270 depending upon the shader program instructions. Gatekeeper 210 selects Feedback Output 276 when fragment data is processed in multiple passes through Fragment Shader 155. Gate Keeper 220 receives the state bundles and shader program instructions from Rasterizer 150. An IPU (Instruction Processing Unit) 222 within Gate Keeper 220 generates codewords from the shader program instructions and inserts the state bundles or codewords in a fragment data stream output to a Shader Core 230. Shader Core 230 performs floating-point computations such as triangle parameter interpolation and reciprocals using PCUs (Programmable Computation Unit) 235 on the fragment data stream received from Gate Keeper 220. The position of each codeword in the fragment data stream specifies the PCU 235 that each codeword configures. Alternatively, each codeword includes an address specifying the PCU that each codeword configures. Fragment data processed by Shader Core 230 is optionally input to a Core Back End FIFO 290. State bundles and codewords are output by Shader Core 230 to a Texture Unit 240.

When specified by the codewords received from Shader Core 230 to do so, Texture Unit 240 reads map data (height field, bump, texture, video field data, filter coefficients, and the like) and shader program instructions from Local Memory 140 or Host Memory 112, via Memory Controller 120, using a RI (Read Interface) 242 within Texture Unit 240. The map data stored in graphics memory may be generated by Programmable Graphics Processor 105, by Host Processor 114, by another device, by a human, or the like. The map data or shader program instructions are received by Texture Unit 240 from Memory Controller 120. Texture Unit 240 processes the map data using filtering functions such as trilinear interpolation, bilinear interpolation, anisotropic filtering, poly-phase filtering, and the like, as described further herein. The processed map data is output to a Remap 250 along with the shader program instructions. The shader program instructions specify the computations, precision of the computations and the precision of the output(s) of the computations performed by PCUs 232. An IPU 222 within Remap 250 interprets the shader program instructions and generates codewords that control the processing completed by PCUs 232 in Fragment-processing Pipeline 160.

When multi-pass operations are being performed within Fragment Shader 155, Remap 250 also reads the data fed back from Combiners 270 via a Quad Loop Back 256, synchronizing the fed back data with the processed map data and shader program instructions received from Texture Unit 240. Remap 250 formats the processed map data and fed back data, outputting codewords and formatted data to Shader Back End 260. Shader Back End 260 receives fragment data from Shader Core 230 via Core Back End FIFO 290 and triangle data from Gate Keeper 220 (the triangle data was received by Gate Keeper 220 from Shader Triangle Unit 210). Shader Back End 260 synchronizes the fragment and triangle data with the formatted data from Remap 250. Shader Back End 260 performs computations in PCUs 232 using the input data (formatted data, fragment data, and triangle data) based on codewords received from Remap 250. Shader Back End 260 outputs codewords and shaded fragment data.

The output of Shader Back End 260 is input to Combiners 270 where the codewords are executed by PCUs 232 within Combiners 270 that, in turn, output combined fragment data. Operations performed to produce the combined fragment data include selection, subtraction, addition, and multiplication. The codewords executing in the current pass control whether the combined fragment data will be fed back within Fragment Shader 155 to be processed in a subsequent pass. Combiners 270 optionally output codewords, to be executed by Shader Core 230 and Texture Unit 240 in a subsequent pass, to Gate Keeper 220 using Feedback Output 276. Combiners 270 also optionally output combined fragment data to Quad Loop Back 256 to be used by Remap 250 in a subsequent pass. Finally, Combiners 270 optionally output combined fragment data, e.g., x, y, color, depth, configuration control, other parameters, to Raster Analyzer 165.

Raster Analyzer 165 includes a RI 242 and a WR (write interface) 244 to Memory Controller 120. Raster Analyzer 165 performs raster operations, such as stencil test, z test, blending, and the like, using the combined fragment data and pixel data stored in a location in graphics memory corresponding to the x,y coordinates associated with the combined fragment data. The output data from Raster Analyzer 165 is written back to the location in graphics memory corresponding to the x,y coordinates associated with the output data. The output data is represented in one or more formats as specified by the codewords. For example, color data may be written as 16, 32, 64, or 128 bit per pixel fixed-point or floating-point values to be scanned out for display. Specifically, four 16 bit floating-point components are combined forming 64 bits of color data for each pixel. Likewise four 32 bit floating-point components are combined forming 128 bits of color data for each pixel. Combinations of various numbers of bits of floating-point or fixed-point components may be combined to form 16, 32, 64 or 128 or more bit color data formats.

The color data may represent RGBA (red, green, blue, and alpha), YIQ, YUVA, YCbCr, or the like. The Y component in YUV, YIQ and YCrCb representations is luminance and U, V, I, Q, Cr and Cb are chrominance components. R, G and B components are a combination of luminance and chrominance. Color data may be stored in graphics memory to be used as a texture map by a shader program executed in a subsequent pass through Fragment-processing Pipeline 160 or through Graphics-processing Pipeline 103. Alternatively, color and depth data may be written, and later read and processed by Raster Analyzer 165 to generate the final pixel data prior to being scanned out for display via Output Controller 180.

During the transfer of film to video each film frame is decomposed into an odd field including odd horizontal scan lines from a film frame and an even field including even horizontal scan lines from the film frame for display on an interlaced display such as an NTSC video display. Information may be encoded with the data for use during deinterlacing or chroma up-sampling, e.g., a 3:2 pulldown flag, a progressive_frame flag, a repeat_first_field flag. Each field within a film frame is captured at the same moment in time, therefore when odd and even field pairs for film frames are displayed simultaneously, as on a progressive display, spatial distortion visual artifacts, such as blurring, are not introduced. In contrast, each field within a video frame is captured at a different point in time for interlaced display. When video fields are displayed simultaneously spatial distortion visual artifacts may be introduced. When an odd and an even field from different film frames are displayed simultaneously spatial distortion visual artifacts may also be introduced, for example during progressive display of 3:2 pulldown processed film frames. A video filtering technique known in the art as deinterlacing may be used to process video frames or 3:2 pulldown processed film frames for progressive display.

Fragment-processing Pipeline 160 may be programmed to perform video filtering functions, such as deinterlacing, deblocking, scaling, and the like, on multiple video fields stored in graphics memory. In some embodiments of Programmable Graphics Processor 105, the video filtering functions are performed in real-time. The multiple video fields are filtered in Fragment-processing Pipeline 160 to generate filtered frames, e.g., deinterlaced frames, deblocked frames, scaled frames, and the like. Depending on the number of pixels, video fields, frames to be filtered, or the number of filtering operations to be performed, multiple passes within Fragment Shader 155 may be needed to execute the shader program. Multiple passes within Fragment Shader 155 may be completed during a single pass through Fragment-processing Pipeline 160. At the completion of a pass through Fragment-processing Pipeline 160, the filtered frame is output by Raster Analyzer 165 and stored in graphics memory. Other filtering functions include gamma correction, reverse gamma correction, chroma up-sampling, color space conversion, and the like, encoded in a shader program.

Figure 3A:
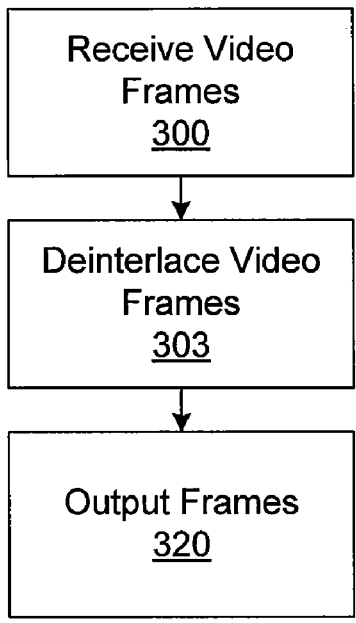
FIGS. 3A, 3B, 3C, 3D, and 3E are flow diagrams of exemplary embodiments of video filtering processes in accordance with one or more aspects of the present invention.

FIG. 3A is a flow diagram of a video filtering process specified by a shader program resulting in the generation of deinterlaced frames. In step 300 RI 242 within Texture Unit 240 receives an input video signal including a sequence of odd and even fields of video image data from Memory Controller 120. In step 303 at least one PCU 232 in Shader Back End 260 processes the video image data to produce deinterlaced video data as specified by the shader program. Alternatively, at least one PCU 232 in Combiners 270 processes the video image data to produce the deinterlaced video data as specified by the shader program. In step 320 output frames of the deinterlaced video data are output by Fragment-processing Pipeline 160 to Memory Controller 120. The output frames are stored in graphics memory and may be output for display or to a film recording device by Output Controller 180 or written to a peripheral device, e.g., disk drive, tape, compact disk, or the like, using Interface 117.

Figure 3B:
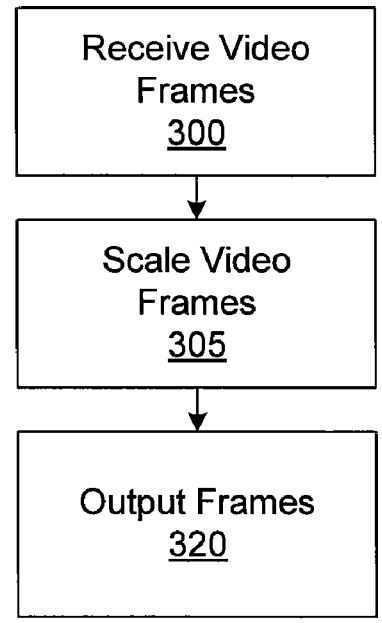

FIG. 3B is a flow diagram of a video filtering process as specified by a shader program resulting in the generation of scaled frames, e.g., up-sampled frames or down-sampled frames. Video filters include non-linear filters, filters with more than two taps, filters with negative lobes, and the like. In step 300 RI 242 within Texture Unit 240 receives an input video signal including a sequence of odd and even fields of video image data from Memory Controller 120. In step 305 at least one PCU 232 in Shader Back End 260 processes the video image data, applying a video filter as described further herein, to produce scaled video data as specified by the shader program. In an alternate embodiment, in step 305 at least one PCU 232 in Combiners 270 processes the video image data, applying the video filter to produce scaled video data as specified by the shader program. Alternatively, the video image data is processed in multiple passes within Fragment Shader 155, through Quad Loop Back 256 or Feedback Output 276, to produce the scaled video data as specified by the shader program. In step 320 output frames of the scaled video data are output by Fragment-processing Pipeline 160 to Memory Controller 120. The output frames are stored in graphics memory and may be output for display or to a film recording device by Output Controller 180 or written to a peripheral device, e.g., disk drive, tape, compact disk, or the like, using Interface 117.

Figure 3C:
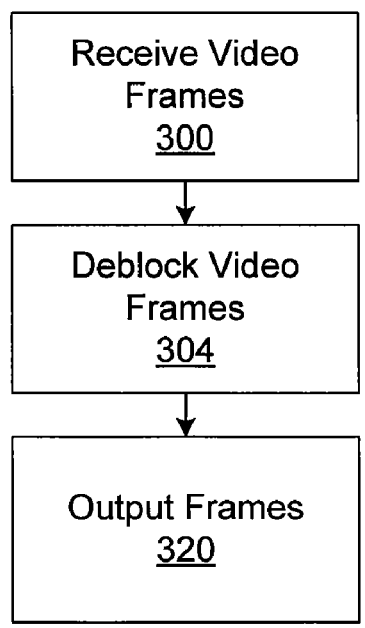

FIG. 3C is a flow diagram of a video filtering process specified by a shader program reducing blocking artifacts of output frames. Blocking artifacts are introduced during block based encoding of an image. Pixel color discontinuities appear in the decoded image at the block encoding boundaries, typically every 4 or 8 pixels horizontally and vertically. Video filtering may be used to "deblock" an image by processing the image using a deblocking function as described further herein. In step 300 RI 242 within Texture Unit 240 receives an input video signal including a sequence of odd and even fields of video image data from Memory Controller 120. In step 304 at least one PCU 232 in Shader Back End 260 processes the video image data to produce deblocked video data, as specified by the shader program. Alternatively, at least one PCU 232 in Combiners 270 processes the video image data to produce the deblocked video data, as specified by the shader program. In step 320 output frames of the deblocked video data are output by Fragment-processing Pipeline 160 to Memory Controller 120. The output frames are stored in graphics memory and may be output for display or to a film recording device by Output Controller 180 or written to a peripheral device, e.g., disk drive, tape, compact disk, or the like, using Interface 117.

Figure 3D:
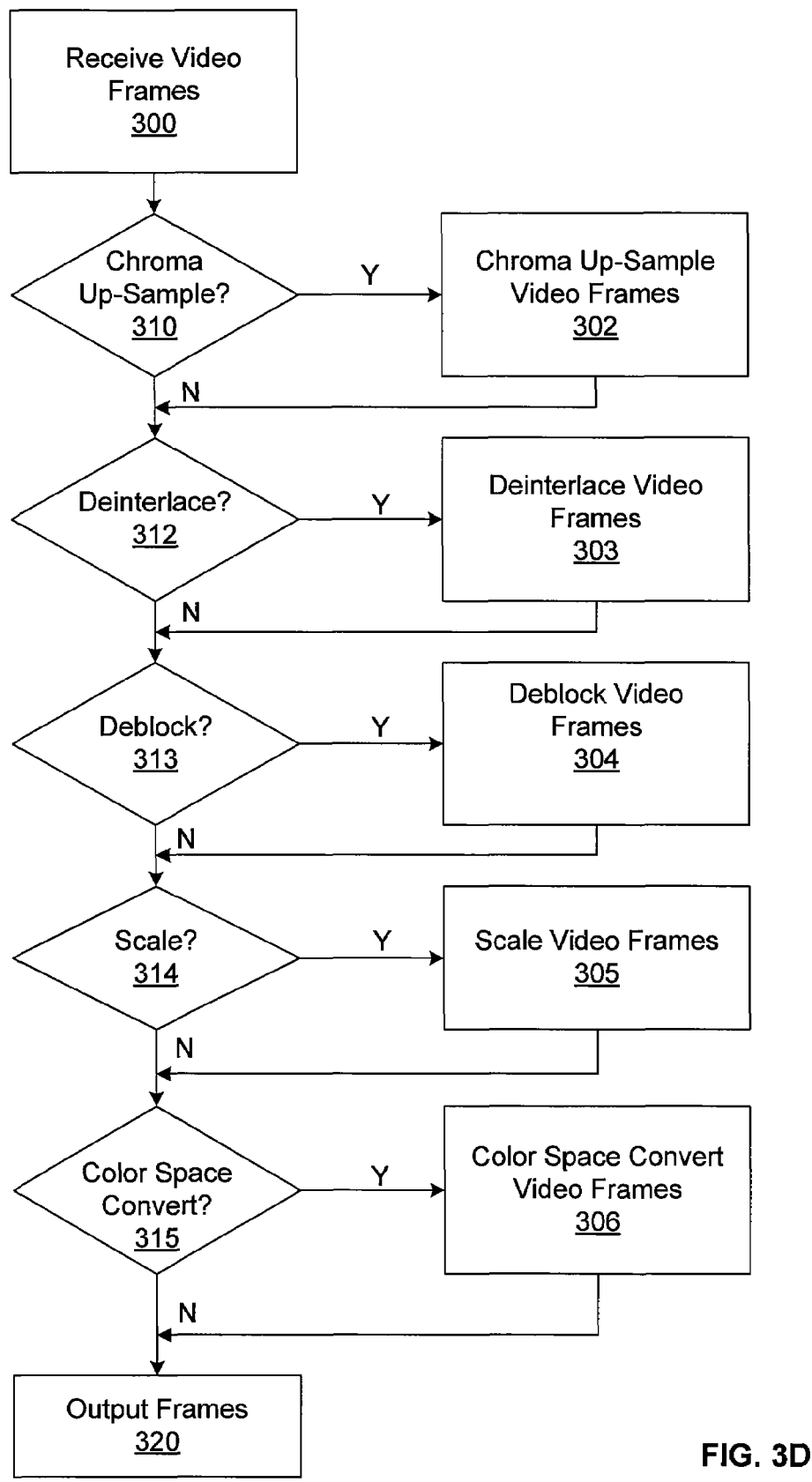

FIG. 3D is a flow diagram of video filtering processes specified by a shader program including the steps in FIGS. 3A, 3B, and 3C. In step 300 RI 242 within Texture Unit 240 receives an input video signal including a sequence of odd and even fields of video image data from Memory Controller 120. RI 242 also receives shader program instructions from RI 242 and outputs the shader program instructions and video image data to Remap 250. Remap 250 outputs the video image data and codewords generated by IPU 222 using the shader program instructions to Shader Back End 260. In step 310, Shader Back End 260 determines if the codewords specify to perform a chroma up-sampling function, and, if so, in step 302 PCUs 232 within Shader Back End 260 are configured to chroma up-sample the video fields, producing chroma up-sampled video data and proceeds to step 312.

Chroma up-sampling is used in the art to convert 4:2:0 format video data into 4:2:2 format video data or 4:4:4 format video data. For example, chrominance data, e.g., Cr and Cb or U and V, for two scanlines within 4:2:2 format video data is interpolated to generate an additional scaline of chrominance data positioned between the two scanlines for 4:4:4 format video data. In another example, chrominance data for two pixels within a scanline is interpolated to generate chrominance data for an additional pixel positioned between the two pixels. Chrominance data is generated to double the chrominance resolution, converting 4:2:0 format video data into 4:2:2 format video data. The 4:2:2 format video data may be converted to 4:4:4 format video data as described above. In some embodiments chroma up-sampling is performed on video frames and in other embodiments chroma up-sampling is performed on video fields that are combined to produce chroma up-sampled video frames.

Continuing in step 312, Shader Back End 260 determines if the codewords specify to perform a deinterlacing function, and, if so, in step 303 at least one PCU 232 in Shader Back End 260 processes the video image data or the chroma up-sampled video data to produce deinterlaced video data and proceeds to step 313. If in step 312, Shader Back End 260 determines the codewords do not specify to perform a deinterlacing function, Shader Back End 260 also proceeds to step 313. In step 313, Shader Back End 260 determines if the codewords specify to perform a deblocking function, and, if so, in step 304 at least one PCU 232 in Shader Back End 260 processes the video image data, the chroma up-sampled video data, or the deinterlaced video data to produce deblocked video data and proceeds to step 314. If in step 313, Shader Back End 260 determines the codewords do not specify to perform a deblocking function, Shader Back End 260 also precedes to step 314. In an alternate embodiment steps 313 and 304 precede steps 312 and 303.

In step 314 Shader Back End 260 determines if the codewords specify to perform a scaling function, and, if so, in step 305 at least one PCU 232 in Shader Back End 260 processes the video image data, the chroma up-sampled video data, the deinterlaced video data, or the deblocked video data, applying a video filter to produce scaled video data and proceeds to step 315. In an alternate embodiment, in step 314 Shader Back End 260 outputs the video image data, the chroma up-sampled video data, the deinterlaced video data, or the deblocked video data to Combiners 270 and Combiners 270 determines if the codewords specify to perform a scaling function, and, if so, in step 305 at least one PCU 232 in Combiners 270 converts the video image data, the chroma up-sampled video data, the deinterlaced video data, or the deblocked video data from one color format to another color format to produce the scaled video data and proceeds to step 315. If in step 314 Shader Back End 260 determines the codewords do not specify to perform a scaling function, Shader Back End 260 also precedes to step 315. In the alternate embodiment, if in step 314 Combiners 270 determines the codewords do not specify to perform a scaling function, Combiners 270 also proceed to step 315.

In step 315 Shader Back End 260 determines if the codewords specify to perform a color space conversion function, and, if so, in step 306 at least one PCU 232 in Shader Back End 260 converts the video image data, the chroma up-sampled video data, the deinterlaced video data, the deblocked video data, or the scaled video data, from one color format to another color format to produce color converted video data and proceeds to step 320. In the alternate embodiment, in step 315 Combiners 270 determines if the codewords specify to perform a color space conversion function, and, if so, in step 306 at least one PCU 232 in Combiners 270 converts the video image data, the chroma up-sampled video data, the deinterlaced video data, the deblocked video data, or the scaled video data, from one color format to another color format to produce color space converted video data and proceeds to step 320. In a further alternate embodiment, in step 315 Combiners 270 outputs the video image data, the chroma up-sampled video data, the deinterlaced video data, the deblocked video data, or the scaled video data to Raster Analyzer 165 and Raster Analyzer 165 determines if the codewords specify to perform a color space conversion function, and, if so, in step 306 Raster Analyzer 165 converts the video image data, the chroma up-sampled video data, the deinterlaced video data, the deblocked video data, or the scaled video data, from one color format to another color format to produce color space converted video data and proceeds to step 320. If in step 315 Shader Back End 260 determines the codewords do not specify to perform a color space conversion function, Shader Back End 260 also precedes to step 320. In the alternate embodiment, if in step 315, Combiners 270 determines the codewords do not specify to perform a color space conversion function, Combiners 270 also precedes to step 320. In the further alternate embodiment, if in step 315, Raster Analyzer 165 determines the codewords do not specify to perform a color space conversion function, Raster Analyzer 165 also precedes to step 320.

Steps 302, 303, 304, 305, and 306 may be completed in a single pass through Fragment-processing Pipeline 160 to produce the chroma up-sampled video data, the deinterlaced video data, the deblocked video data, the scaled video data, or the color space converted video data. The single pass through Fragment-processing Pipeline 160 may include multiple passes within Fragment Shader 155, through Quad Loop Back 256 or Feedback Output 276, to produce the deinterlaced video data, the deblocked video data, the scaled video data, or the color space converted video data.

In step 320 output frames of the video image data, the chroma up-sampled video data, the deinterlaced video data, the deblocked video data, the scaled video data, or the color converted video data are output by Shader Back End 260 through Combiners 270 and Raster Analyzer 165 to Memory Controller 120. In the alternate embodiment, in step 320 the output frames of the video image data, the chroma up-sampled video data, the deinterlaced video data, the deblocked video data, the scaled video data, or the color converted video data are output by Combiners 270 through Raster Analyzer 165 to Memory Controller 120. In the further alternate embodiment, in step 320 the output frames of the video image data, the chroma up-sampled video data, the deinterlaced video data, the deblocked video data, the scaled video data, or the color converted video data are output by Raster Analyzer 165 to Memory Controller 120. The output frames are stored in graphics memory and may be output for display or to a film recording device by Output Controller 180 or written to a peripheral device, e.g., disk drive, tape, compact disk, or the like, using Interface 117.

Figure 3E:
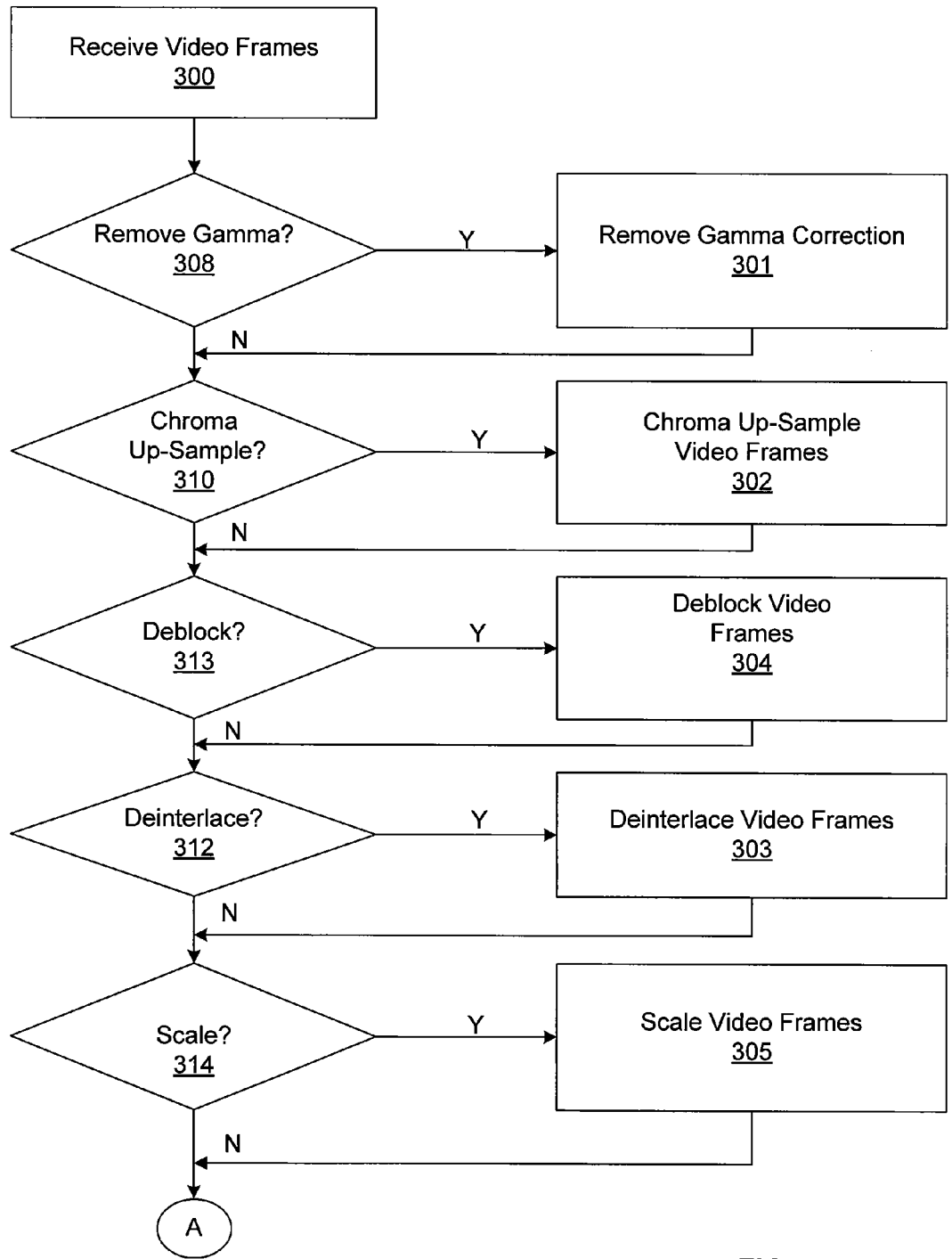
Figure 3E:
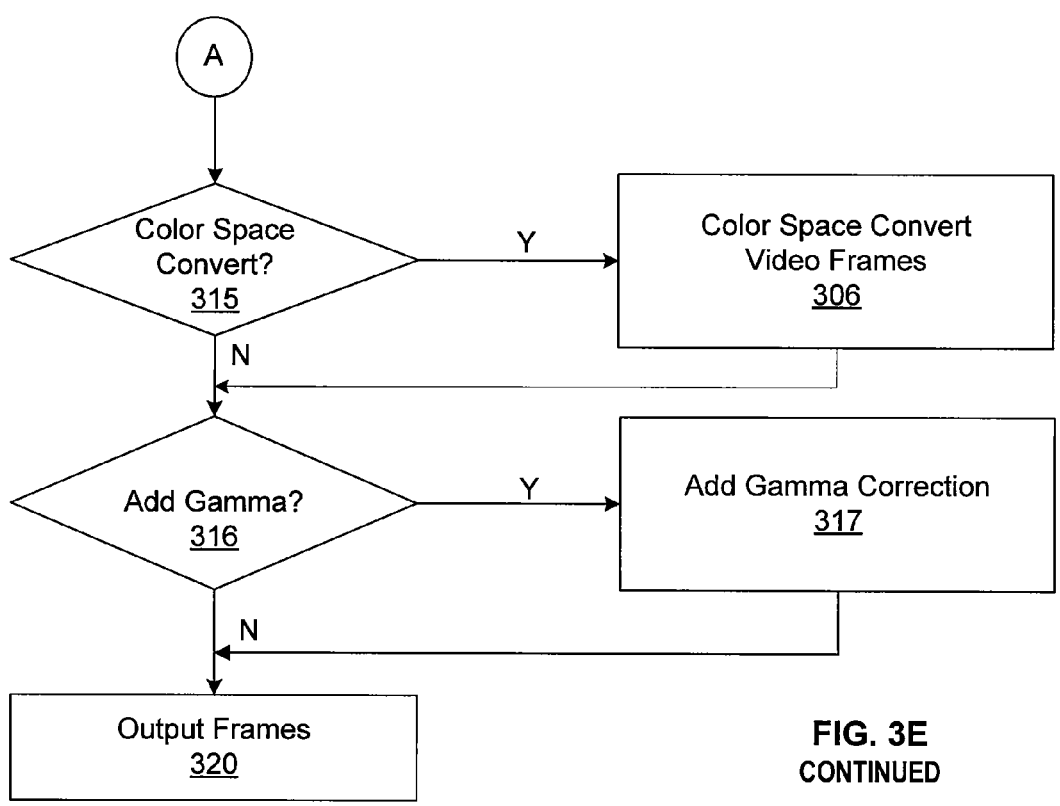

FIG. 3E is a flow diagram of video filtering processes specified by a shader program including the steps in FIG. 3D. In step 300 RI 242 within Texture Unit 240 receives an input video signal including a sequence of odd and even fields of video image data from Memory Controller 120. RI 242 also receives shader program instructions from RI 242 and outputs the shader program instructions and video image data to Remap 250. Remap 250 outputs the video image data and codewords generated by IPU 222 using the shader program instructions to Shader Back End 260. In step 308, Shader Back End 260 determines if the codewords specify to perform a reverse gamma correction function, and, if so, in step 301 at least one PCU 232 within Shader Back End 260 is configured to reverse gamma correct the video image data, producing reverse gamma corrected video data and proceeds to step 310.

If in step 308, Shader Back End 260 determines the codewords do not specify to perform a reverse gamma correction function, Shader Back End 260 also proceeds to step 310.

Gamma correction is conventionally used to convert color data from a linear scale to a non-linear scale, for display on a monitor. Pre-gamma corrected data should be reverse gamma corrected prior to performing any operation that affects light intensity, such as, filtering, overlaying, transforming, and the like. Performing operations that affect light intensity using gamma corrected data may result in visual artifacts, particularly on boundaries between regions of high color contrast. Processed reverse gamma corrected data should be gamma corrected prior to display on a non-linear display device, such as a monitor.

In step 310, Shader Back End 260 determines if the codewords specify to perform a chroma up-sampling function, and, if so, in step 302 PCUs 232 within Shader Back End 260 are configured to chroma up-sample the video fields, producing chroma up-sampled video data and proceeds to step 313. In step 313, Shader Back End 260 determines if the codewords specify to perform a deblocking function, and, if so, in step 304 at least one PCU 232 in Shader Back End 260 processes the video image data, or the chroma up-sampled video data to produce deblocked video data and proceeds to step 312. If in step 313, Shader Back End 260 determines the codewords do not specify to perform a deblocking function, Shader Back End 260 also precedes to step 312.

In step 312, Shader Back End 260 determines if the codewords specify to perform a deinterlacing function, and, if so, in step 303 at least one PCU 232 in Shader Back End 260 processes the video image data, the chroma up-sampled video data, or the deblocked video data to produce deinterlaced video data and proceeds to step 314. If in step 312, Shader Back End 260 determines the codewords do not specify to perform a deinterlacing function, Shader Back End 260 also proceeds to step 314. In an alternate embodiment steps 312 and 303 precede steps 313 and 304.

Processing continues with steps 314, 305, 315, and 306 as described in relation to FIG. 3D with the inclusion of the reverse gamma corrected video data optionally produced in step 301. In step 316 Shader Back End 260 determines if the codewords specify to perform a gamma correction function, and, if so, in step 306 at least one PCU 232 in Shader Back End 260 gamma corrects the video image data, the reverse gamma corrected video data, the chroma up-sampled video data, the deinterlaced video data, the deblocked video data, the scaled video data, or the color converted video data to produce gamma corrected video data and proceeds to step 320.

In the alternate embodiment, in step 316 Combiners 270 determines if the codewords specify to perform the gamma correction function, and, if so, in step 306 at least one PCU 232 in Combiners 270 gamma corrects the video image data, the reverse gamma corrected video data, the chroma up-sampled video data, the deinterlaced video data, the deblocked video data, the scaled video data, or the color space converted video data to produce gamma corrected video data and proceeds to step 320.

In a further alternate embodiment, in step 315 Combiners 270 outputs the video image data, the reverse gamma corrected video data, the chroma up-sampled video data, the deinterlaced video data, the deblocked video data, the scaled video data, or the color space converted video data to Raster Analyzer 165 and Raster Analyzer 165 determines if the codewords specify to perform the gamma correction function, and, if so, in step 306 Raster Analyzer 165 gamma corrects the video image data, the reverse gamma corrected video data, the chroma up-sampled video data, the deinterlaced video data, the deblocked video data, the scaled video data, or the color space converted video data to produce gamma corrected video data and proceeds to step 320.

If in step 315 Shader Back End 260 determines the codewords do not specify to perform a color space conversion function, Shader Back End 260 also precedes to step 320. In the alternate embodiment, if in step 315, Combiners 270 determines the codewords do not specify to perform the gamma correction function, Combiners 270 also precedes to step 320. In the further alternate embodiment, if in step 315, Raster Analyzer 165 determines the codewords do not specify to perform a gamma correction function, Raster Analyzer 165 also precedes to step 320.

Steps 301, 302, 303, 304, 305, 306, and 317 may be completed in a single pass through Fragment-processing Pipeline 160 to produce the reverse gamma corrected video data, the chroma up-sampled video data, the deinterlaced video data, the deblocked video data, the scaled video data, the color space converted video data, or the gamma corrected video data. The single pass through Fragment-processing Pipeline 160 may include multiple passes within Fragment Shader 155, through Quad Loop Back 256 or Feedback Output 276, to produce the deinterlaced video data, the deblocked video data, the scaled video data, the color space converted video data, or the gamma corrected video data.

In step 320 output frames of the video image data, the reverse gamma corrected video data, the chroma up-sampled video data, the deinterlaced video data, the deblocked video data, the scaled video data, the color converted video data, or the gamma corrected video data are output by Shader Back End 260 through Combiners 270 and Raster Analyzer 165 to Memory Controller 120.

In the alternate embodiment, in step 320 the output frames of the video image data, the reverse gamma corrected video data, the chroma up-sampled video data, the deinterlaced video data, the deblocked video data, the scaled video data, the color converted video data, or the gamma corrected video data are output by Combiners 270 through Raster Analyzer 165 to Memory Controller 120.

In the further alternate embodiment, in step 320 the output frames of the video image data, the reverse gamma corrected video data, the chroma up-sampled video data, the deinterlaced video data, the deblocked video data, the scaled video data, the color converted video data, or the gamma corrected video data are output by Raster Analyzer 165 to Memory Controller 120. The output frames are stored in graphics memory and may be output for display or to a film recording device by Output Controller 180 or written to a peripheral device, e.g., disk drive, tape, compact disk, or the like, using Interface 117.

An application programming interface (API) includes a function call used to configure Fragment-processing Pipeline 160 to filter video data. A graphics application executed by Host Processor 114 (in FIG. 1) may issue the function call to configure Fragment-processing Pipeline 160 within Programmable Graphics Processor 105 to process the video data using one or more of a variety of video filtering functions. The video filtering functions may include a reverse gamma correction function, a deinterlacing function, a scaling function, a deblocking function, a color space conversion function, a chroma up-sampling function, or a gamma correction function. In one embodiment the function call is used to configure Fragment-processing Pipeline 160 to process the video data using a deinterlacing function and a deblocking function. In another embodiment the function call is used to configure Fragment-processing Pipeline 160 to process the video data using a scaling function, a color space conversion function, and a chroma up-sampling function.

A device driver executed by Host Processor 114 communicates between Programmable Graphics Processor 105 and the API. In one embodiment the function call communicates with Programmable Graphics Processor 105 via the device driver to modify bits in a register that is readable by Fragment-processing Pipeline 160 and the bits correspond to the variety of video filtering functions. In another embodiment the function call is a data structure, including fields containing source and destination locations and enable fields for video filtering functions. A video data location field specifies a location in graphics memory where source video data is stored. A destination address field specifies a location in graphics memory where filtered video data produced by processing the source video data is stored. A video data format field specifies the data format used to represent the source video data. Enable fields, such as a deinterlacing enable field, a scaling enable field, a deblocking enable field, a color space conversion enable field, and the like, each correspond to a video filtering function and are used to control whether or not the corresponding video filtering function is used to process the source video data.

Figure 4A:
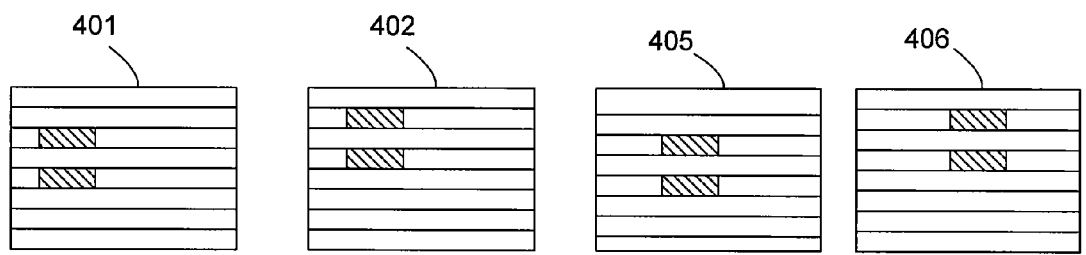
FIGS. 4A and 4B are exemplary video fields and corresponding video interlaced frames.
Figure 4B:
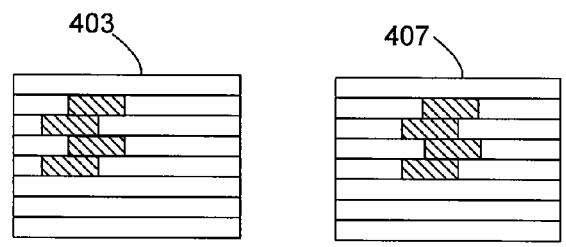

FIGS. 4A and 4B are exemplary video fields and corresponding video interlaced frames. FIG. 4A includes a sequence of four video fields, a Video Field 401, a Video Field 402, a Video Field 405, and a Video Field 406. Video Field 401 and Video Field 405 are "odd" video fields, containing the even numbered scanlines for two sequential frames, a Frame 403 and a Frame 407 in FIG. 4B respectively. Video Field 402 and Video Field 406 are "even" video fields, containing the even numbered scanlines for Frame 403 and Frame 407 respectively. Alternatively, Video Field 401 and Video Field 405 are "even" video fields, and Video Field 402 and Video Field 406 are "odd" video fields. Each field in FIG. 4A was captured at a different point in time for interlaced display showing a square moving from left to right. When Video Field 401 and Video Field 402 are displayed simultaneously as shown in Frame 403 spatial distortion visual artifacts, e.g. combing artifacts, are introduced. The combing artifacts appear along the vertical edges of the square in Frame 403 and Frame 407. A spatially adaptive deinterlacing function may be used to process Frame 403 and Frame 407 for progressive display, reducing the spatial distortion visual artifacts.

Figure 4C:
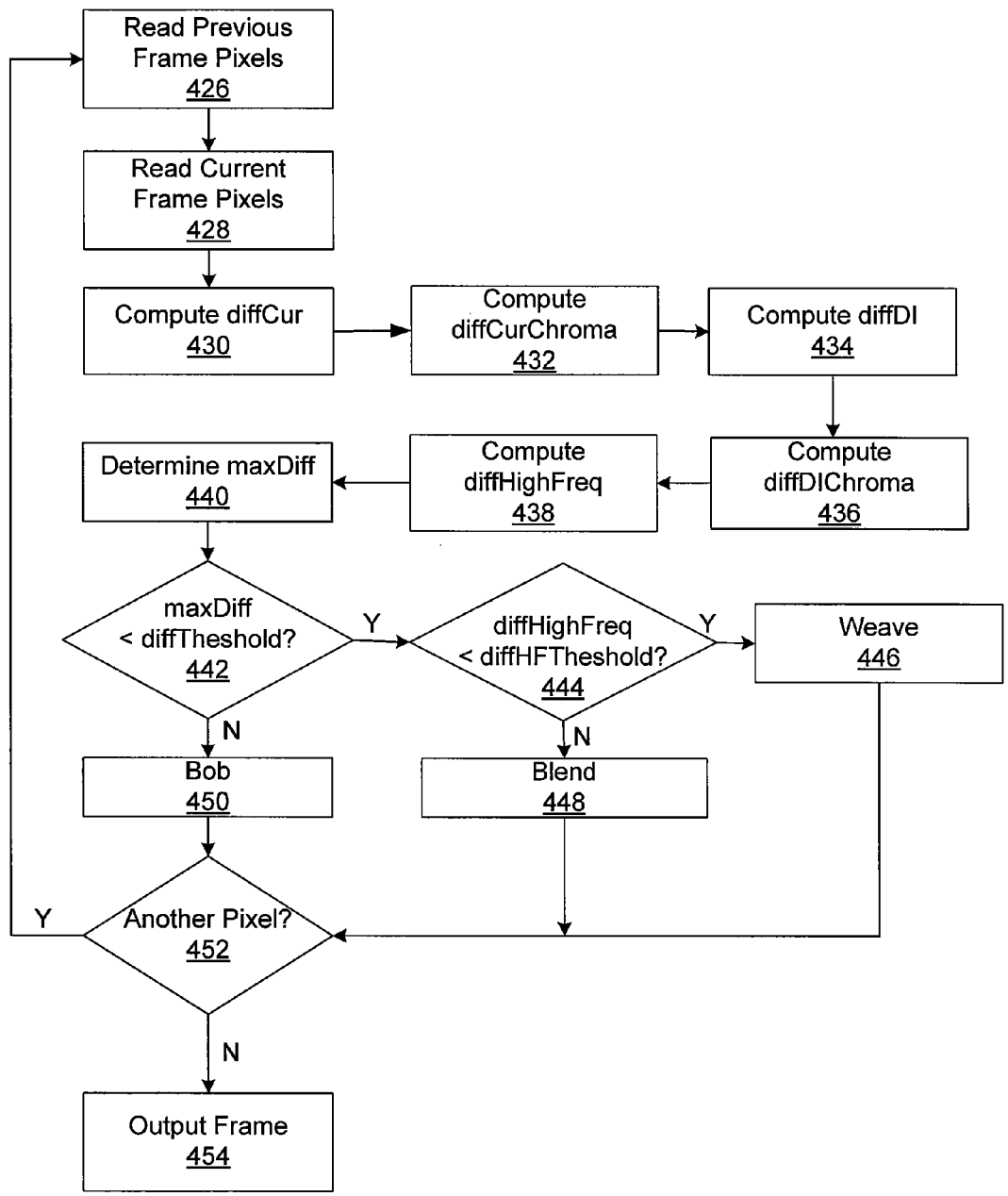
FIG. 4C is a flow diagram of an exemplary embodiment of motion adaptive deinterlacing operations.

FIG. 4C is a flow diagram of an exemplary embodiment of a spatially variant deinterlacing function, e.g., motion adaptive deinterlacing, specified by a shader program. The spatially variant deinterlacing function applies a bob operation, a blend operation, or a weave operation to each pixel in a frame to deinterlace the frame. Application of the bob operation, the blend operation, or the weave operation to produce a deinterlaced pixel is determined based on characteristics of video image data, e.g., luminance, chrominance, or the like, in a current interlaced frame to video image data associated with a corresponding pixel within a previous interlaced frame, as specified by the shader program.

In step 426 Texture Unit 240 reads two adjacent vertically aligned pixels from graphics memory using RI 242, as specified by the shader program. One pixel, prevPixOdd, is read from an odd scanline in a previous frame of video data, e.g., Frame 403, and another vertically aligned pixel, prevPixEven, is read from an even scanline, from the previous frame of video data. Texture Unit 240 outputs prevPixOdd and prevPixEven to Shader Back End 260. In step 428 Texture Unit 240 reads two more adjacent vertically aligned pixels from graphics memory using RI 242, as specified by the shader program. One pixel, CurPixOdd, is read from an odd scanline in a frame of video data, e.g., Frame 407, and another vertically aligned pixel, CurPixEven, is read from an even scanline, from the frame of video data. Texture Unit 240 outputs curPixOdd and curPixEven to Shader Back End 260.

In step 430 Shader Back End 260 is configured by codewords to compute diffCur by subtracting the luminance of the pixCurEven and the luminance of the pixPrevEven to produce a difference, and taking the absolute value of the difference to produce diffCur. In step 432 Shader Back End 260 is configured by codewords to compute diffCurChroma by subtracting the chrominance of the pixCurEven and the chrominance of the pixPrevEven to produce a difference, and taking the absolute value of the difference to produce diffCurChroma. In step 434 Shader Back End 260 is configured by codewords to compute diffDl by subtracting the luminance of the pixCurOdd and the luminance of the pixPrevOdd to produce a difference, and taking the absolute value of the difference to produce diffDl. In step 436 Shader Back End 260 is configured by codewords to compute diffDlChroma by subtracting the chrominance of the pixCurOdd and the chrominance of the pixPrevOdd to produce a difference, and taking the absolute value of the difference to produce diffDlChroma.

In step 438 Shader Back End 260 is configured by codewords to compute diffHighFreq. pixPrevOdd is subtracted from an average, of pixCurOdd and pixCurEven to produce a difference, and taking the absolute value of the difference to produce diffHighFreq. In step 440 Shader Back End 260 is configured by codewords to determine the greatest of diffCur, diffDl, half of diffCurChroma, and half of diffDlChroma and set maxDiff equal to that value. In step 442 Shader Back End 260 is configured by codewords to compare maxDiff to a diffThreshold. diffThreshold may be programmed or fixed. If maxDiff is not less than diffTHreshold, in step 450, Shader Back End 260 is configured by codewords to perform a "bob" operation, averaging pixCurEven and pixCurOdd to produce a color value for a corresponding pixel in the deinterlaced frame. Shader Back End 260 outputs the deinterlaced pixel to graphics memory through Combiners 270 and Raster Analyzer 165. In an alternate embodiment, Shader Back End 260 is configured by the codewords to process the deinterlaced pixel to produce a deblocked pixel, a scaled pixel, a color space converted pixel, or a gamma corrected pixel.

In step 452 Fragment Shader 155 determines if the shader program specifies that there is another pixel to be deinterlaced, and, if so, returns to step 426. Steps 426 through 440 are repeated for the other pixel. In step 442 Shader Back End 260 is configured by codewords to compare maxDiff to a diffThreshold, and If maxDiff is less than diffTHreshold, in step 444, Shader Back End 260 is configured by codewords to compare diffHighFreq to a diffHFThreshold. diffHFThreshold may be programmed or fixed. If diffHighFreq is not less than diffTHreshold, in step 450, Shader Back End 260 is configured by codewords to perform a "blend" operation, averaging a corresponding deinterlaced pixel in the previous frame with an average of pixCurEven and pixCurOdd to produce a color value for a corresponding pixel in the current deinterlaced frame. Shader Back End 260 outputs the deinterlaced pixel to graphics memory through Combiners 270 and Raster Analyzer 165. In an alternate embodiment, Shader Back End 260 is configured by the codewords to process the deinterlaced pixel to produce a deblocked pixel, a scaled pixel, a color space converted pixel, or a gamma corrected pixel.

In step 452 Fragment Shader 155 determines if the shader program specifies that there is another pixel to be deinterlaced, and, if so, returns to step 426. Steps 426 through 440 are repeated for the other pixel. In step 442 Shader Back End 260 is configured by codewords to compare maxDiff to a diffThreshold, and If maxDiff is less than diffTHreshold, in step 444, Shader Back End 260 is configured by codewords to compare diffHighFreq to a diffHFThreshold. diffHFThreshold may be programmed or fixed. If diffHighFreq is less than diffTHreshold, in step 446, Shader Back End 260 is configured by codewords to perform a "weave" operation, selecting the color of a corresponding deinterlaced pixel in the previous frame as the color of the pixel in the current deinterlaced frame. Shader Back End 260 outputs the pixel in the current deinterlaced frame to graphics memory through Combiners 270 and Raster Analyzer 165. In an alternate embodiment, Shader Back End 260 is configured by the codewords to process the pixel to produce a deblocked pixel, a scaled pixel, a color space converted pixel, or a gamma corrected pixel.

In step 452 Fragment Shader 155 determines if the shader program specifies that there is another pixel to be deinterlaced, and, if not, in step 454 the current deinterlaced frame is read from graphics memory by Output Controller 180 for display or for output to a film recording device, a peripheral device, e.g., disk drive, tape, compact disk, or the like, using Interface 117.

Figure 4D:
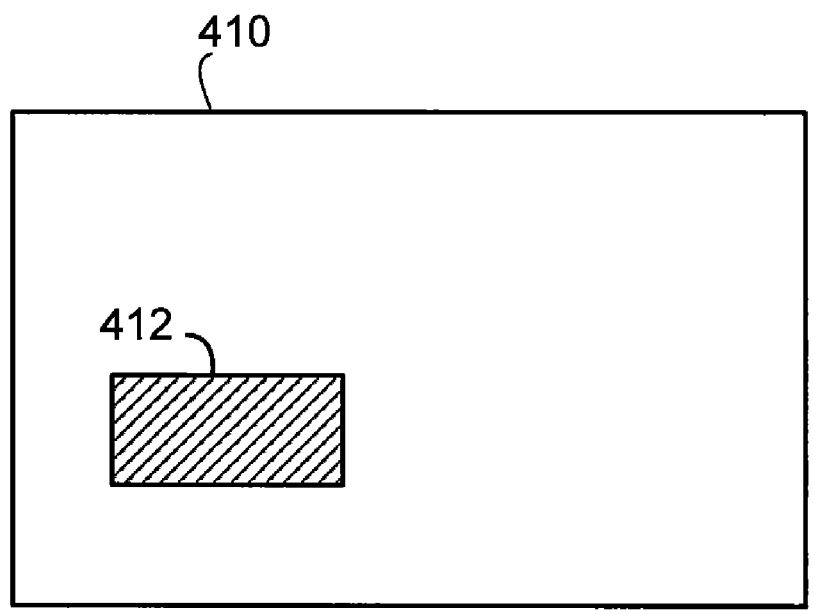
FIG. 4D is exemplary video frames.
Figure 4D:
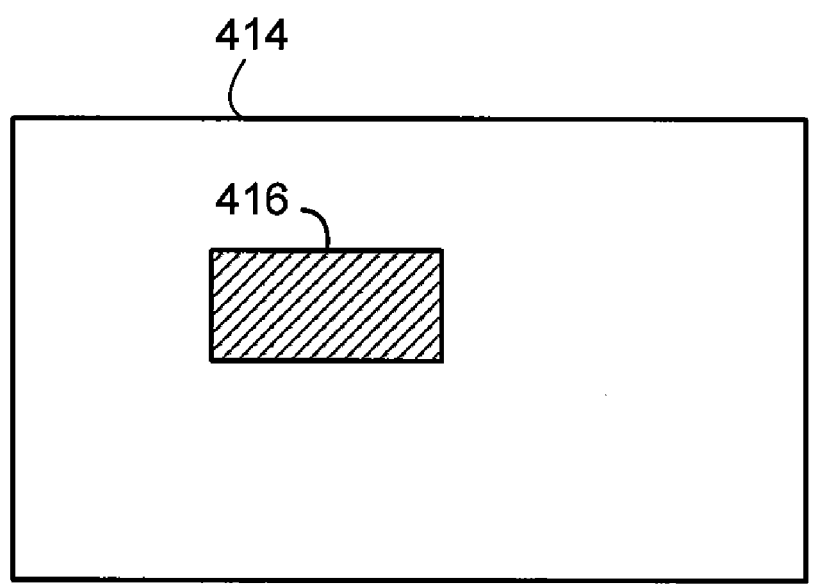

FIG. 4D is exemplary video frames within a sequence of video frames including an object moving from a Region 412 in the lower left corner of Frame 410 to a Region 416 in the upper center of Frame 414. An optical flow technique known in the art is used to correlate pixels in Frame 410 with pixels in Frame 414 and compute a motion vector for all of the pixels in Frame 414, each pixel in Frame 414, or a portion of the pixels in Frame 414, such as Region 416. The motion vector, i.e., two dimensional offset, may be computed by Host Computer 110 or Programmable Graphics Processor 105. The motion vector may be used to perform motion compensated deinterlacing, another spatially variant deinterlacing function.

Figure 4E:
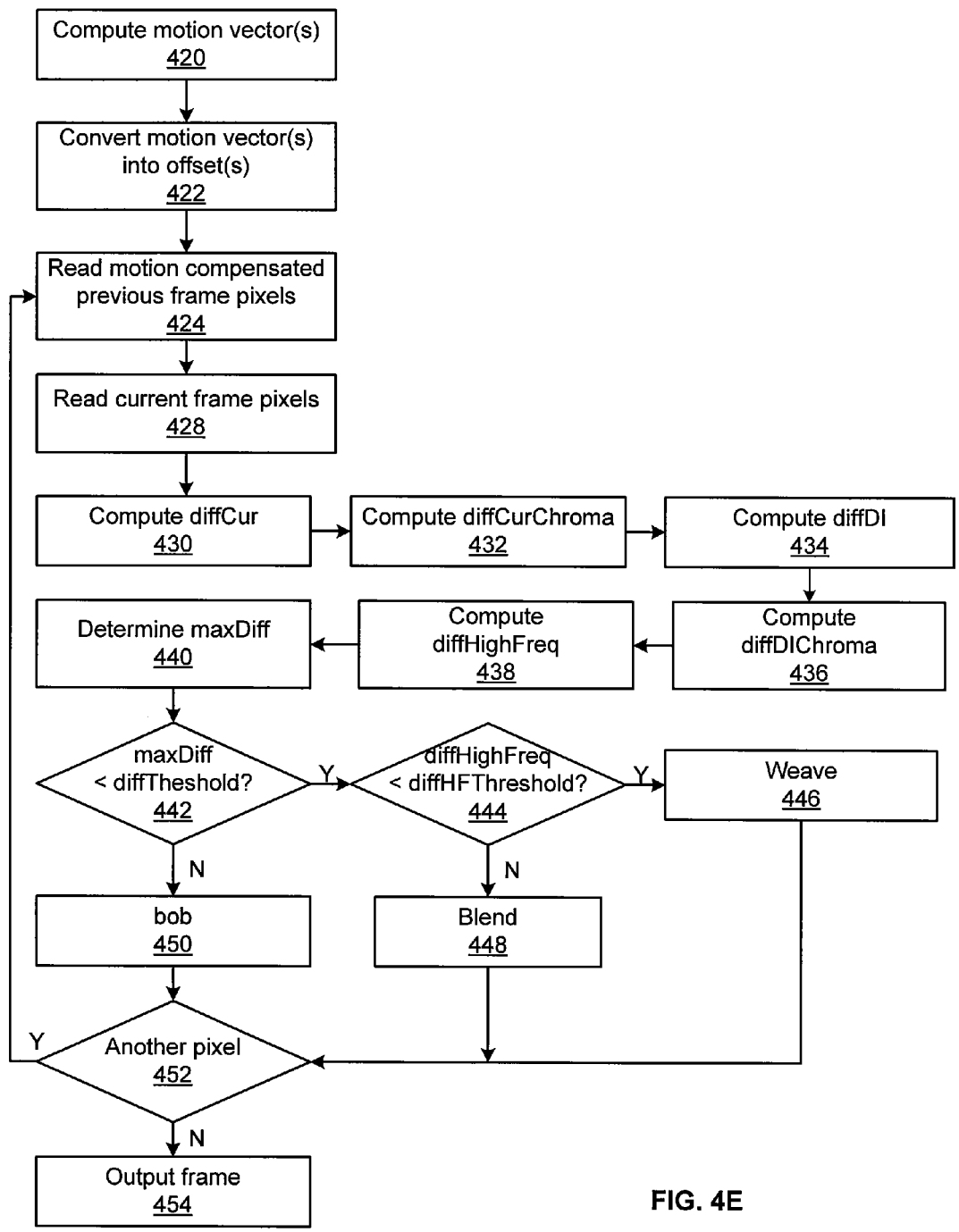
FIG. 4E is a flow diagram of an exemplary embodiment of motion compensated deinterlacing operations.

FIG. 4E is a flow diagram of an exemplary embodiment of deinterlacing operations to perform motion compensated deinterlacing, as specified by a shader program, including the steps shown in FIG. 4D. In step 420, a motion vector is computed by Host Computer 110 or Programmable Graphics Processor 105 for Frame 414 relative to Frame 410. In step 422 one or more motion vectors are converted into x,y offsets that are applied to translate Frame 410 such that Region 412 aligns with Region 416 in Frame 414. x,y coordinates associated with Frame 410 are translated using the x,y offsets to produce displaced x,y coordinates. The displaced x,y coordinates are used to produce texture map coordinates for reading Frame 410 stored as a texture map. In step 424 Texture Unit 240 reads two adjacent vertically aligned pixels within Frame 410 as texels, applying Frame 410 to the geometry defined by the displaced x,y coordinates, thereby reading motion compensated pixels from Frame 410.

In an alternate embodiment the one or more motion vectors are converted into texture coordinate offsets that are applied to translate the texture coordinates, s and t, used by Texture Unit 240 to read Frame 410 stored in graphics memory as a texture map in step 424. In a further alternate embodiment, in step 420 a plurality of motion vectors are computed by Host Computer 110 or Programmable Graphics Processor 105 for Frame 414 relative to Frame 410 and stored as a texture coordinate displacement map in graphics memory. In the further alternate embodiment, in step 422 texture coordinate displacements are read from the texture coordinate displacement map and applied to texture coordinates associated with Frame 410 to map Frame 410 to a geometry, e.g., rectangle, polygon, mesh, or the like, such that Region 412 aligns with Region 416 in Frame 414 when Frame 410 is read as a texture map by Texture Unit 240 in step 424.

Continuing in step 428, Texture Unit 240 reads two adjacent vertically aligned pixels within Frame 414 stored as a texture map. Steps 430 through 452 and step 454 are completed as described in relation to FIG. 4D to perform motion adaptive filtering to deinterlace Frame 414 using a motion compensated Frame 410.

Figure 5A:
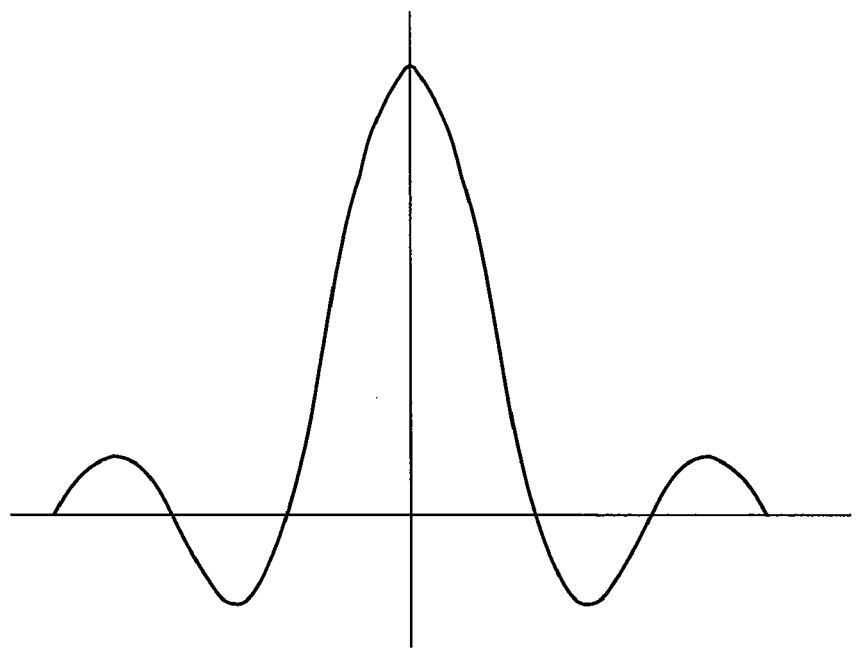
FIGS. 5A and 5B are exemplary video filter kernels.
Figure 5B:
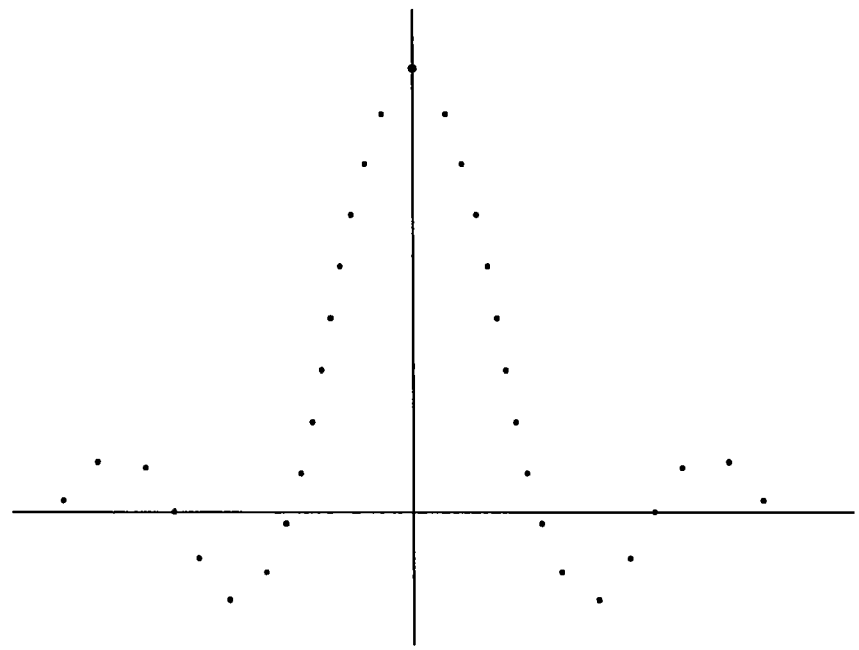

FIGS. 5A and 5B are exemplary video filter kernels. FIG. 5A is a filter function that is a portion of (sin x)/x. FIG. 5B is a sampled filter function that is the portion of (sin x)/x. The filter function is a non-linear filter with negative lobes. Each point in FIG. 5B represents a filter tap and is stored as a filter function coefficient in an array, e.g., filter texture map. Alternatively, the filter function may be stored with fewer taps or more taps, depending on the quality of the filtering specified by the application. Alternatively, a filter function has a wider bandwidth for up-scaling an image than a filter function for down-scaling the image. Each location in the filter texture map corresponds to a specific filter kernel phase, to be described further herein. Furthermore, several filter function coefficients may be stored in each location of the filter texture map. Furthermore still, the filter function may be a three dimensional filter function.

A pixel in a source image, stored as a texture map, may be filtered with the filter function centered on the pixel to produce a pixel in an up-scaled image, e.g., destination image, using a filter kernel phase of zero. Pixels neighboring the pixel in the destination image may be produced by applying the filter function to the pixel in the source image using a non-zero filter kernel phase. The filter function is effectively stepped across the source image using different filter kernel phases to produce neighboring pixels in the destination image. Likewise, during down-scaling, the filter function is effectively stepped (in larger size steps) across the source image, reading and filtering multiple pixels to produce each pixel in the destination image.

Figure 5C:
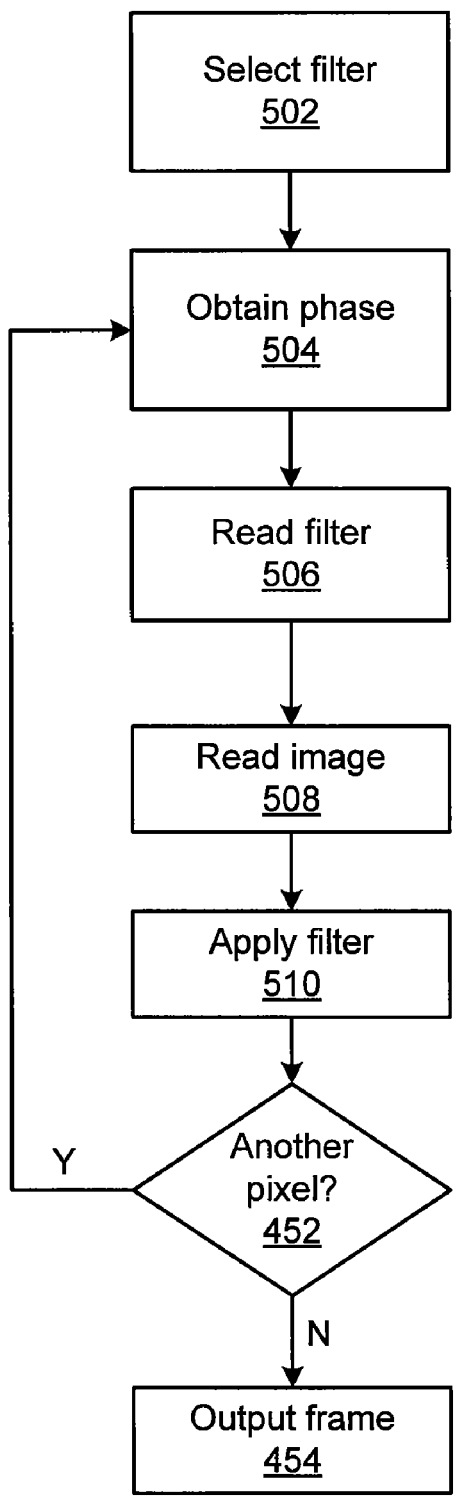
FIG. 5C is a flow diagram of an exemplary embodiment of a scaling operation in accordance with one or more aspects of the present invention.

FIG. 5C is a flow diagram of an exemplary embodiment of a scaling operation specified by a shader program in accordance with one or more aspects of the present invention. In step 502 an application selects a scaling filter to be applied to a source image producing a destination image (scaled source image). The scaling filter may be selected based on specific characteristics or desired filtering effects, e.g., blur, magnification, sharpen, and the like. The scaling filter is stored as an array of filter values within a filter texture map in graphics memory and is associated with a unique texID (texture identification). Data associated with each pixel in the destination image includes a pair of filter texture map coordinates, e.g., s and t or u and v.

In step 504 a filter kernal phase is obtained for a pixel in the destination image. In one embodiment, the filter kernal phase for each pixel is determined by Host Computer 110 and stored as a filter kernal phase texture map in graphics memory. Texture Unit 240 reads the filter kernal phase for each pixel in the destination image from the filter kernal phase texture map to obtain the filter kernel phase for each pixel in the destination image. In another embodiment, the filter kernal phase for each pixel is computed by Fragment-processing Pipeline 160 as specified by the shader program. For example, texture coordinates ranging in value from zero to less that one may be computed by configuring one or more PCUs 232 in either Shader Core 230 or Shader Back End 260 to interpolate texture map coordinates across a geometry as specified by the shader program. The computed texture coordinates are the filter kernal phases needed to access the filter texture map.

The computed filter kernal phases may be stored in graphics memory as a filter kernal phase texture map to be read by Texture Unit 240 or fed back within Fragment Shader 155 to Texture Unit 240 using Feedback Output 276.

In yet another embodiment, a fractional portion of each scaling filter texture map coordinate for each destination pixel is extracted within Texture Unit 240 using an FRC (fraction) program instruction. The fractional portions are used as the filter kernel phase for accessing the filter texture map. The FRC program instruction sets a destination register to a fractional portion of a source register, such as a source register containing a texture coordinate. The fractional portion represents a value greater than or equal to zero and less than one. The data in the source register may be represented in a floating-point format or a -point format.

In step 506 Texture Unit 240 is configured to read filter function coefficients ($f_{tap0}$, $f_{tap1}$, $f_{tap2}$, $f_{tapn}$, and the like) stored in the filter texture map using the filter kernel phase (phase) obtained in step 504 as specified by the program instructions. In step 508 Texture Unit 240 is configured to read the source image pixels (source_pixel$_0$, source_pixel$_1$, source_pixel$_2$, source_pixel$_n$, and the like) from the source image texture map stored in graphics memory as specified by the program instructions. In step 510 PCUs 232 within Shader Back End 260 are configured by the codewords to apply the scaling filter function to the source image pixels read by Texture Unit 240 in step 508 to compute an output pixel color. For example, the following equation may be evaluated to determine the output pixel color:

Output pixel=source_pixel$_0$×$f_{tap0}$(phase)+source_pixel$_1$×$f_{tap0}$(phase)+source_pixel$_2$×$f_{tap2}$(phase)

Alternatively, in step 510 PCUs 232 within Combiners 270 are configured by the codewords to apply the scaling filter function to the source image pixels read by Texture Unit 240 in step 508 to compute an output pixel color.

In alternate embodiments, the output pixel color is computed using two or more passes within Fragment Shader 155 using Feedback Output 276 to pass partially computed output pixel colors, filter function texture map coordinates, and source image texture map coordinates to Texture Unit 240 to read additional filter function coefficients and source image pixels.

In step 452 Fragment Shader 155 determines if the shader program specifies to compute another destination image pixel, and, if so, Texture Unit 240 repeats steps 504, 506, 508, and 510 to compute the other destination image pixel. In step 452 Fragment Shader 155 determines if the shader program specifies that there is another destination pixel to be computed, and, if not, in step 454 the destination image (scaled source image) is read from graphics memory by Output Controller 180 for display or for output to a film recording device, a peripheral device, e.g., disk drive, tape, compact disk, or the like, using Interface 117.

Figure 6A:
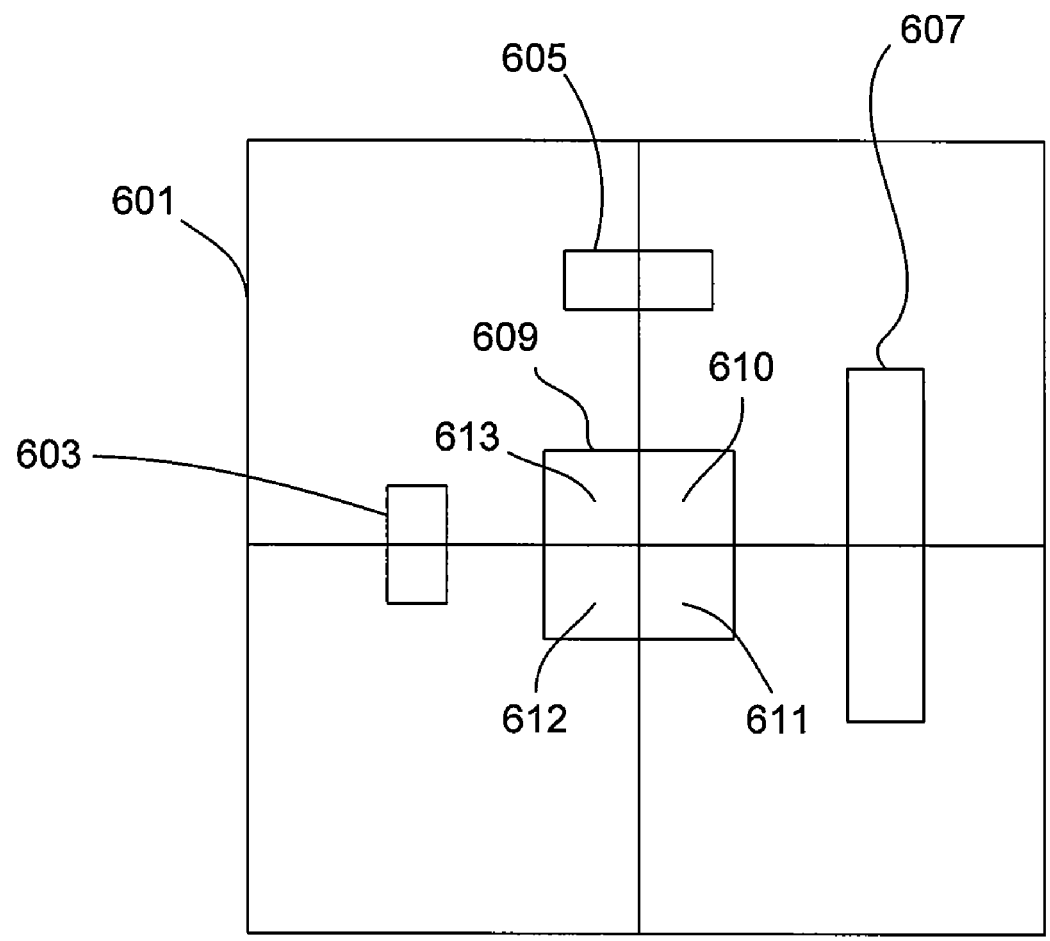
FIG. 6A is a portion of an exemplary video frame.

FIG. 6A is a portion of an exemplary video frame including block encoding boundaries. A Portion 601 contains four blocks, where the dimensions of each block are n×n, conventionally 8×8 or 4×4. When a block encoding technique is used that encodes the pixels within n×n block independent form the block's neighbors, color discontinuities may be introduced in adjacent pixels on either side of block boundaries. A Region 603 contains two vertically aligned pixels, each pixel lying on either side of a horizontal block encoding boundary (a horizontal edge). A Region 605 contains two horizontally aligned pixels, each pixel lying on either side of a vertical block encoding boundary (a vertical edge). A Region 607 contains eight vertically aligned pixels, four pixels lying on either side of a horizontal block encoding boundary.

Figure 6B:
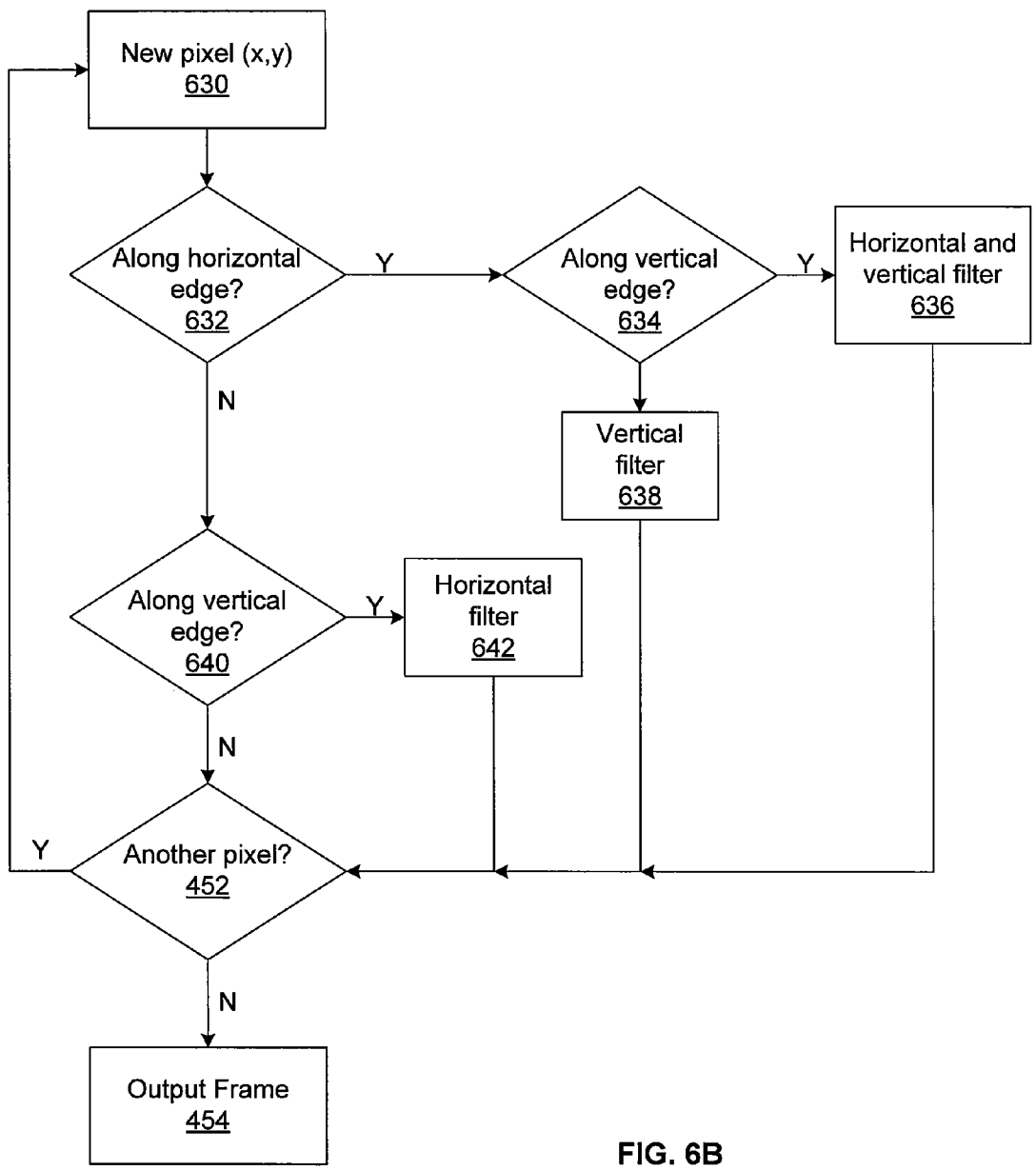
FIGS. 6B and 6C are flow diagrams of exemplary embodiments of deblocking functions in accordance with one or more aspects of the present invention.

FIG. 6B is a flow diagram of an exemplary embodiment of a spatially dependent deblocking function as specified by a shader program in accordance with one or more aspects of the present invention. Fragment-processing Pipeline 160 executes the shader program to filter regions within a block encoded source image to produce a deblocked destination image. In step 630 Fragment Shader 155 receives a first source pixel associated with x,y coordinates. In step 632 Fragment Shader 155 is configured by codewords to determine if the first source pixel lies along, i.e., borders on either side, a horizontal block encoding boundary, and, if so, in step 634, Fragment Shader 155 determines if the first source pixel lies along a vertical block encoding boundary.

In step 634, if Fragment Shader 155 determines the first source pixel lies along a vertical boundary, in step 636 Texture Unit 240 is configured by the codewords to read the first source pixel and neighboring source pixels as specified by the program instructions and output the first source pixel and neighboring source pixels to Shader Back End 260. Shader Back End 260 is configured by the codewords to compute the color of a first destination pixel by filtering the first source pixel and the neighboring source pixels forming a j×k region. For example, the color of Destination Pixel 610 may be computed by filtering a 2×2 region including source pixels associated with x,y coordinates of Destination Pixel 610, Destination Pixel 611, Destination Pixel 612, and Destination Pixel 613. In another example, the color of Destination Pixel 609 may be computed by filtering a 3×2 region including source pixels associated with x,y coordinates of Destination Pixel 610, Destination Pixel 611, Destination Pixel 612, Destination Pixel 613, Destination Pixel 614, and Destination Pixel 615.

In step 452 Fragment Shader 155 determines if the shader program specifies that there is another source pixel to be deblocked, and, if so, returns to step 630. Step 632 is repeated for the second source pixel and in step 634 Fragment Shader 155 determines a second source pixel does not lie along a vertical boundary. In step 638 Texture Unit 240 is configured by the codewords to read the second source pixel and neighboring vertically aligned source pixels as specified by the program instructions and output the second source pixel and neighboring vertically aligned source pixels to Shader Back End 260. Shader Back End 260 is configured by the codewords to compute the color of a second destination pixel by filtering the second source pixel and the neighboring vertically aligned source pixels forming a 1×j region. For example, the color of a destination pixel within Region 603 may be computed by filtering the two source pixels within Region 603. In another example, the color of a destination pixel within Region 607 may be computed by filtering the eight source pixels within Region 607.

In step 452 Fragment Shader 155 determines if the shader program specifies that there is another source pixel to be deblocked, and, if so, returns to step 630. In step 632 Fragment Shader 155 is configured by the codewords to determine if a third source pixel lies along a horizontal block encoding boundary, and, if not, in step 640, Fragment Shader 155 determines if the third source pixel lies along a vertical block encoding boundary. In step 640 if Fragment Shader 155 determines the third source pixel does not lie along a vertical block encoding boundary, Texture Unit outputs the third source pixel to Shader Back End 260. Shader Back End 260 is configured by the codewords to output the third source pixel as the third destination pixel and Fragment Shader 155 proceeds to step 452.

In step 640 if Fragment Shader 155 determines the third source pixel lies along a vertical block encoding boundary, in step 642 Texture Unit 240 is configured by the codewords to read the third source pixel and neighboring horizontally aligned source pixels as specified by the program instructions and output the third source pixel and neighboring horizontally aligned source pixels to Shader Back End 260. Shader Back End 260 is configured by the codewords to compute the color of a third destination pixel by filtering the third source pixel and the neighboring horizontally aligned source pixels forming a j×1 region. For example, the color of a destination pixel within Region 605 may be computed by filtering the two source pixels within Region 605.

In step 452 Fragment Shader 155 determines if the shader program specifies that there is another pixel to be deblocked, and, if not, in step 454 the destination image (deblocked source image) is read from graphics memory by Output Controller 180 for display or for output to a film recording device, a peripheral device, e.g., disk drive, tape, compact disk, or the like, using Interface 117.

Figure 6C:
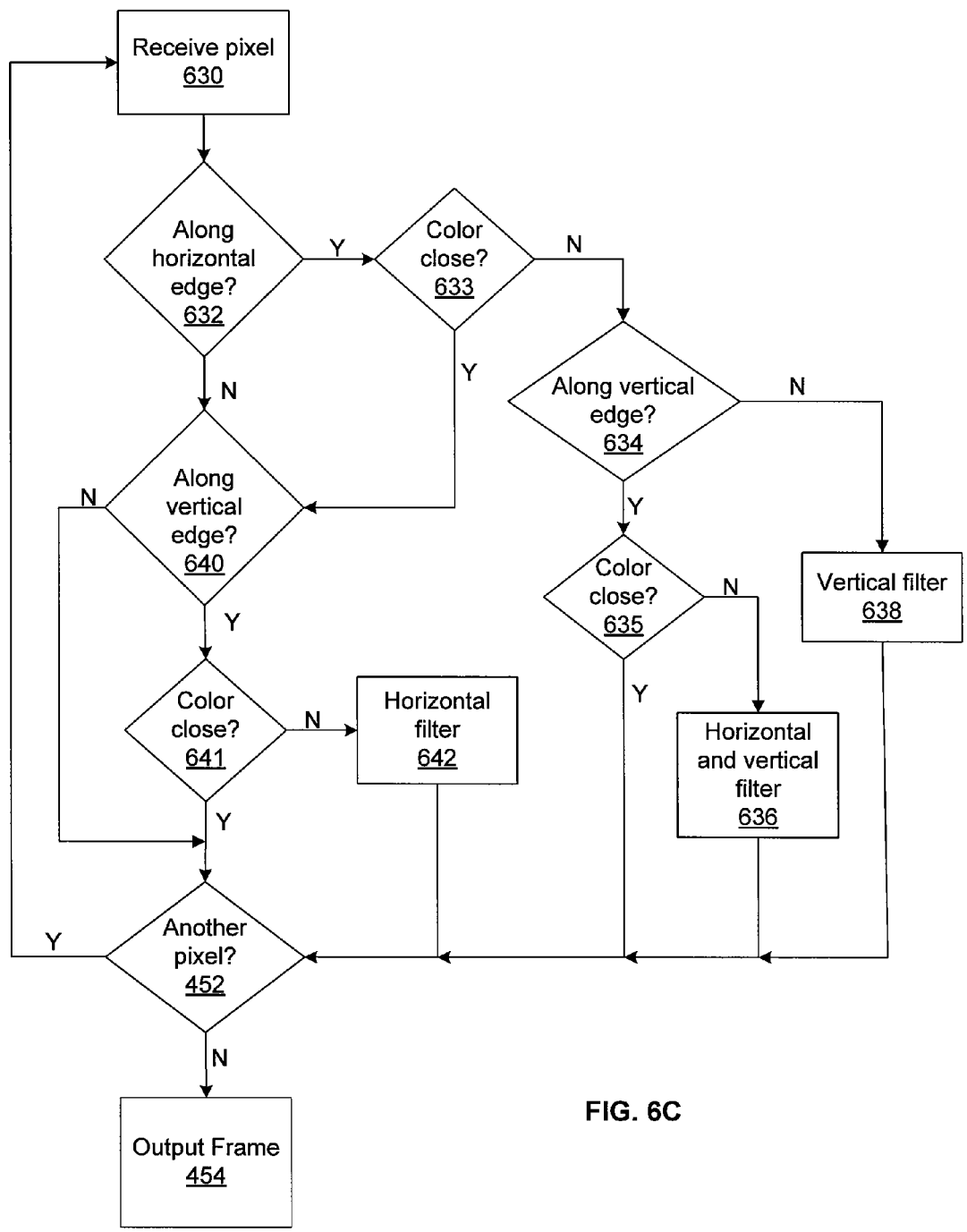

FIG. 6C is a flow diagram of an exemplary embodiment of the spatially dependent deblocking function of FIG. 6B including data dependent deblocking operations in accordance with one or more aspects of the present invention. In step 630 Fragment Shader 155 receives a first source pixel associated with x,y coordinates. In step 632 Fragment Shader 155 is configured by codewords to determine if the first source pixel lies along, i.e., borders on either side, a horizontal block encoding boundary, and, if so, in step 633, Fragment Shader 155 compares color data associated with the first source pixel to color data associated with an adjacent pixel on the other side of the (horizontal) block encoding boundary to produce a color difference value. Fragment Shader 155 determines if the color difference value is within a tolerance. The tolerance may be specified by a program instruction or fixed.

In an alternate embodiment, Fragment Shader 155 compares color data associated with a source pixel to color data associated with several neighboring pixels on either side of the block encoding boundary to produce the color difference value. If, in step 633, Fragment Shader 155 determines the color difference value is not within the tolerance, in step 634, Fragment Shader 155 determines if the first source pixel lies along a vertical block encoding boundary. If, in step 635, Fragment Shader 155 determines the color difference value is within the tolerance Fragment Shader 155 proceeds to step 640, as described further herein.

Continuing in step 634, if Fragment Shader 155 determines the first source pixel lies along a vertical boundary, in step 635, Fragment Shader 155 compares color data associated with the first source pixel to color data associated with an adjacent source pixel on the other side of the (vertical) block encoding boundary to produce a color difference value. Fragment Shader 155 determines if the color difference value is within the tolerance. If, in step 635, Fragment Shader 155 determines the color difference value is not within the tolerance, in step 636 Texture Unit 240 is configured by the codewords to read the first source pixel and neighboring source pixels as specified by the program instructions and output the first source pixel and neighboring source pixels to Shader Back End 260. Shader Back End 260 is configured by the codewords to compute the color of a first destination pixel by filtering the first source pixel and the neighboring source pixels forming a j×k region. If, in step 635, Fragment Shader 155 determines the color difference value is within the tolerance Texture Unit 240 outputs the first source pixel to Shader Back End 260. Shader Back End 260 is configured by the codewords to output the first source pixel as the first destination pixel.

In step 452 Fragment Shader 155 determines if the shader program specifies that there is another source pixel to be deblocked, and, if so, returns to step 630. Step 632 is repeated for the second source pixel and in step 633, Fragment Shader 155 compares color data associated with the second source pixel to color data associated with an adjacent source pixel on the other side of the (horizontal) block encoding boundary to produce a color difference value. If, in step 633, Fragment Shader 155 determines the color difference value is not within the tolerance, in step 634, Fragment Shader 155 determines if the second source pixel lies along a vertical block encoding boundary.

In step 634 Fragment Shader 155 determines a second source pixel does not lie along a vertical boundary, and in step 638 Texture Unit 240 is configured by the codewords to read the second source pixel and neighboring vertically aligned source pixels as specified by the program instructions. Texture Unit 240 outputs the second source pixel and neighboring vertically aligned source pixels to Shader Back End 260. Shader Back End 260 is configured by the codewords to compute the color of a second destination pixel by filtering the second source pixel and the neighboring vertically aligned source pixels forming a 1×j region. For example, the color of a destination pixel within Region 603 may be computed by filtering the two source pixels within Region 603.

In step 452 Fragment Shader 155 determines if the shader program specifies that there is another source pixel to be deblocked, and, if so, returns to step 630. In step 632 Fragment Shader 155 is configured by the codewords to determine if a third source pixel lies along a horizontal block encoding boundary, and, if not, in step 640, Fragment Shader 155 determines if the third source pixel lies along a vertical block encoding boundary. In step 640 if Fragment Shader 155 determines the third source pixel does not lie along a vertical block encoding boundary, Texture Unit 240 outputs the third source pixel to Shader Back End 260. Shader Back End 260 is configured by the codewords to output the third source pixel as the third destination pixel and Fragment Shader 155 proceeds to step 452.

In step 640 if Fragment Shader 155 determines the third source pixel lies along a vertical block encoding boundary, in step 641, Fragment Shader 155 compares color data associated with the third source pixel to color data associated with an adjacent source pixel on the other side of the (vertical) block encoding boundary to produce a color difference value. Fragment Shader 155 determines if the color difference value is within the tolerance.

If, in step 641, Fragment Shader 155 determines the color difference value is not within the tolerance, in step 642 Fragment Shader 155 is configured by the codewords to read the third source pixel and neighboring horizontally aligned source pixels as specified by the program instructions and output the third source pixel and neighboring horizontally aligned source pixels to Shader Back End 260. Shader Back End 260 is configured by the codewords to compute the color of a third destination pixel by filtering the third source pixel and the neighboring horizontally aligned source pixels forming a j×1 region. If, in step 641, Fragment Shader 155 determines the color difference value is within the tolerance Texture Unit 240 outputs the third source pixel to Shader Back End 260. Shader Back End 260 is configured by the codewords to output the third source pixel as the third destination pixel.

In step 452 Fragment Shader 155 determines if the shader program specifies that there is another pixel to be deblocked, and, if not, in step 454 the destination image (deblocked source image) is read from graphics memory by Output Controller 180 for display or for output to a film recording device, a peripheral device, e.g., disk drive, tape, compact disk, or the like, using Interface 117.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

All trademarks are the respective property of their owners. OpenGL is a registered trademark of Silicon Graphics, Inc.

What is claimed is:

1. A computer-implemented method for performing video filtering, the method comprising:
   generating codewords for shader program instructions, wherein the codewords specify performing a scaling function;
   receiving pixel data associated with a pixel within a video frame into a shading pipeline within a programmable graphics processor;
   extracting fractional portions from texture coordinates associated with the pixel to use as a filter kernel phase;
   accessing a plurality of filter values using the filter kernel phase; and
   applying the plurality of filter values to the pixel data to produce scaled pixel data within a scaled video frame.

2. The method of claim 1, wherein the video filtering method further comprises:
   applying at least one of a chroma up-sampling function, a deblocking function, and a color space conversion function within the shading pipeline.

3. The method of claim 1, wherein the video filtering method further comprises:
   applying at least one of a chroma up-sampling function, a deblocking function, and a color space conversion function within the shading pipeline in a single pass of the shading pipeline.

4. The method of claim 2, wherein the deblocking function is a spatially dependent function.

5. The method of claim 4, wherein the deblocking function is a data dependent function.

6. The method of claim 1, wherein the video filtering method further comprises:
   applying at least one of a reverse gamma correction function and a gamma correction function within the shading pipeline.

7. A method for performing video filtering, the method comprising:
   receiving pixel data associated with a pixel within a video frame into a shading pipeline within a programmable graphics processor;
   extracting fractional portions from texture coordinates associated with the pixel to produce a filter kernel phase within the shading pipeline using a shader program;
   accessing a plurality of filter values using the filter kernel phase using the shader program; and
   applying the plurality of filter values to the pixel data to produce scaled pixel data within a scaled video frame using the shader program.

8. The method of claim 7, wherein the video filtering method further comprises:

applying at least one of a chroma up-sampling function, a deblocking function, and a color space conversion function within the shading pipeline using the shader program.

9. The method of claim 8, wherein the deblocking function is a spatially dependent function.

10. The method of claim 9, wherein the deblocking function is a data dependent function.

11. The method of claim 8, wherein the video filtering method further comprises:
applying at least one of a reverse gamma correction function and a gamma correction function within the shading pipeline.

12. A computing system comprising:
a host processor;
a host memory, the host memory storing programs for the host processor;
a system interface configured to interface with the host processor; and
a programmable graphics processor for performing video filtering configured to:
generate codewords for shader program instructions, wherein the codewords specify performing a scaling function,
receive pixel data associated with a pixel within a video frame into a shading pipeline within a programmable graphics processor,
extract fractional portions from texture coordinates associated with the pixel to use as a filter kernel phase,
access a plurality of filter values using the filter kernel phase, and
apply the plurality of filter values to the pixel data to produce scaled pixel data within a scaled video frame.

13. The computing system of claim 12, wherein the programmable graphics processor is further configured to apply at least one of a chroma up-sampling function, a deblocking function, and a color space conversion function within the shading pipeline.

14. The computing system of claim 12, wherein the programmable graphics processor is further configured to apply at least one of a chroma up-sampling function, a deblocking function, and a color space conversion function within the shading pipeline in a single pass of the shading pipeline.

15. The computing system of claim 12, wherein the programmable graphics processor is further configured to apply at least one of a reverse gamma correction function and a gamma correction function within the shading pipeline.

* * * * *

UNITED STATES PATENT AND TRADEMARK OFFICE
CERTIFICATE OF CORRECTION

| | | |
|---|---|---|
| PATENT NO. | : 7,733,419 B1 | Page 1 of 1 |
| APPLICATION NO. | : 11/957363 | |
| DATED | : June 8, 2010 | |
| INVENTOR(S) | : Lew et al. | |

It is certified that error appears in the above-identified patent and that said Letters Patent is hereby corrected as shown below:

Title Page;
On the cover sheet, item (60), please replace "Provisional" with --Divisional--.

Signed and Sealed this
Seventh Day of June, 2011

David J. Kappos
*Director of the United States Patent and Trademark Office*